US009763222B2

(12) United States Patent
Yang et al.

(10) Patent No.: US 9,763,222 B2
(45) Date of Patent: Sep. 12, 2017

(54) MOBILE TERMINAL AND METHOD FOR CONTROLLING THE SAME

(71) Applicant: LG Electronics Inc., Seoul (KR)

(72) Inventors: Yoonseok Yang, Seoul (KR); Yunmi Kwon, Seoul (KR); Yeonsuk Na, Seoul (KR); Sungjin Kang, Seoul (KR); Juha Hyun, Seoul (KR); Shinnyue Kang, Seoul (KR); Seulah Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/009,541

(22) Filed: Jan. 28, 2016

(65) Prior Publication Data

US 2017/0048817 A1 Feb. 16, 2017

(30) Foreign Application Priority Data

Aug. 10, 2015 (KR) .......... 10-2015-0112503
Aug. 10, 2015 (KR) .......... 10-2015-0112504

(51) Int. Cl.
H04M 1/725 (2006.01)
H04W 68/00 (2009.01)
H04L 12/58 (2006.01)
H04W 4/12 (2009.01)
H04W 88/02 (2009.01)

(52) U.S. Cl.
CPC .......... *H04W 68/005* (2013.01); *H04L 51/18* (2013.01); *H04M 1/72547* (2013.01); *H04W 4/12* (2013.01); *H04M 2250/60* (2013.01); *H04W 88/02* (2013.01)

(58) Field of Classification Search
CPC .. H04W 4/12; H04L 12/5895; H04M 1/72547
USPC ................ 455/412.2, 412.1, 414.1, 418
See application file for complete search history.

(56) References Cited

U.S. PATENT DOCUMENTS

2006/0078064 A1* 4/2006 Schmidt .................. H04L 12/14
 375/296
2007/0064899 A1 3/2007 Boss et al.
2010/0042690 A1 2/2010 Wall
2010/0130235 A1* 5/2010 Kim ...................... H04W 64/00
 455/456.3
2011/0213845 A1 9/2011 Logan et al.
2011/0219316 A1 9/2011 Lee et al.
(Continued)

FOREIGN PATENT DOCUMENTS

JP 2006-121351 A 5/2006
KR 10-2007-0099824 A 10/2007
(Continued)

Primary Examiner — Nghi H Ly
(74) Attorney, Agent, or Firm — Birch, Stewart, Kolasch & Birch, LLP

(57) ABSTRACT

A mobile terminal including a display; a wireless communication processor configured to transceive a message with an external device; and a controller configured to display a message interface including a plurality of messages transceived with the external device on the display, and in response to a message change condition indicating a change in a respective message among the plurality of messages transceived with the external device, update and display without user interaction the message interface to indicate the change to the respective message.

19 Claims, 37 Drawing Sheets

(56) References Cited

U.S. PATENT DOCUMENTS

2013/0216039 A1* 8/2013 Mairs .................... H04M 3/424
  379/265.13
2014/0201527 A1 7/2014 Krivorot
2014/0359032 A1 12/2014 Spiegel et al.

FOREIGN PATENT DOCUMENTS

| KR | 10-2010-0007463 A | 1/2010 |
| KR | 10-1415766 B1 | 7/2014 |

* cited by examiner (a)　　　　　　　　　　　　　(b)

MOBILE TERMINAL AND METHOD FOR CONTROLLING THE SAME

Pursuant to 35 U.S.C. §119(a), this application claims the benefit of earlier filing date and right of priority to Korean Application Nos. 10-2015-0112504, filed on Aug. 10, 2015 and 10-2015-0112503, filed on Aug. 10, 2015, the contents of which are hereby incorporated by reference herein in their entirety.

BACKGROUND OF THE INVENTION

Field of the Invention

The present invention relates to a mobile terminal and a method of controlling therefor, and more particularly, to a mobile terminal displaying a received message by changing the received message and a method of controlling therefor.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mounted terminals. There are ongoing efforts to support and increase the functionality of mobile terminals. Such efforts include software and hardware improvements, as well as changes and improvements in the structural components which form the mobile terminal.

Meanwhile, when a message is received, the received message is displayed as it is. In addition, when the user checks the message again, the message is again displayed as it is.

SUMMARY OF THE INVENTION

Accordingly, an object of the present invention is to address the above-noted and other problems.

Another object of the present invention is, if a message is received, to provide a message different from the received message according to a specific condition in a message interface in a mobile terminal.

Another object of the present invention is, if a message is received, to provide a message interface from which the received message is deleted according to a specific condition in a mobile terminal.

Another object of the present invention is, if a plurality of information are included in a message, to output specific information selected from a plurality of the information by a user only to a message interface in a mobile terminal.

The other object of the present invention is, if a message including time information is received, to separately display the time information on a message interface in a mobile terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one aspect of the preset invention, a mobile terminal includes a display unit, a sensing unit, a communication unit configured to transceive a message with an external device and a controller, the controller, if a message is received from the external device, configured to output a first message corresponding to the received message in a message interface, the controller, if the mobile terminal corresponds to a message change condition, configured to output a second message in the message interface. In this instance, the second message corresponds to a message of which at least a part of the first message is changed.

To further achieve these objects and other advantages and in accordance with the purpose of the invention, as embodied and broadly described herein, according to a different aspect of the present invention, a method of controlling a mobile terminal includes the steps of, if a message is received from an external device, outputting a first message corresponding to the received message in a message interface and if the mobile terminal corresponds to a message change condition, outputting a second message in the message interface. In this instance, the second message corresponds to a message of which at least a part of the first message is changed.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
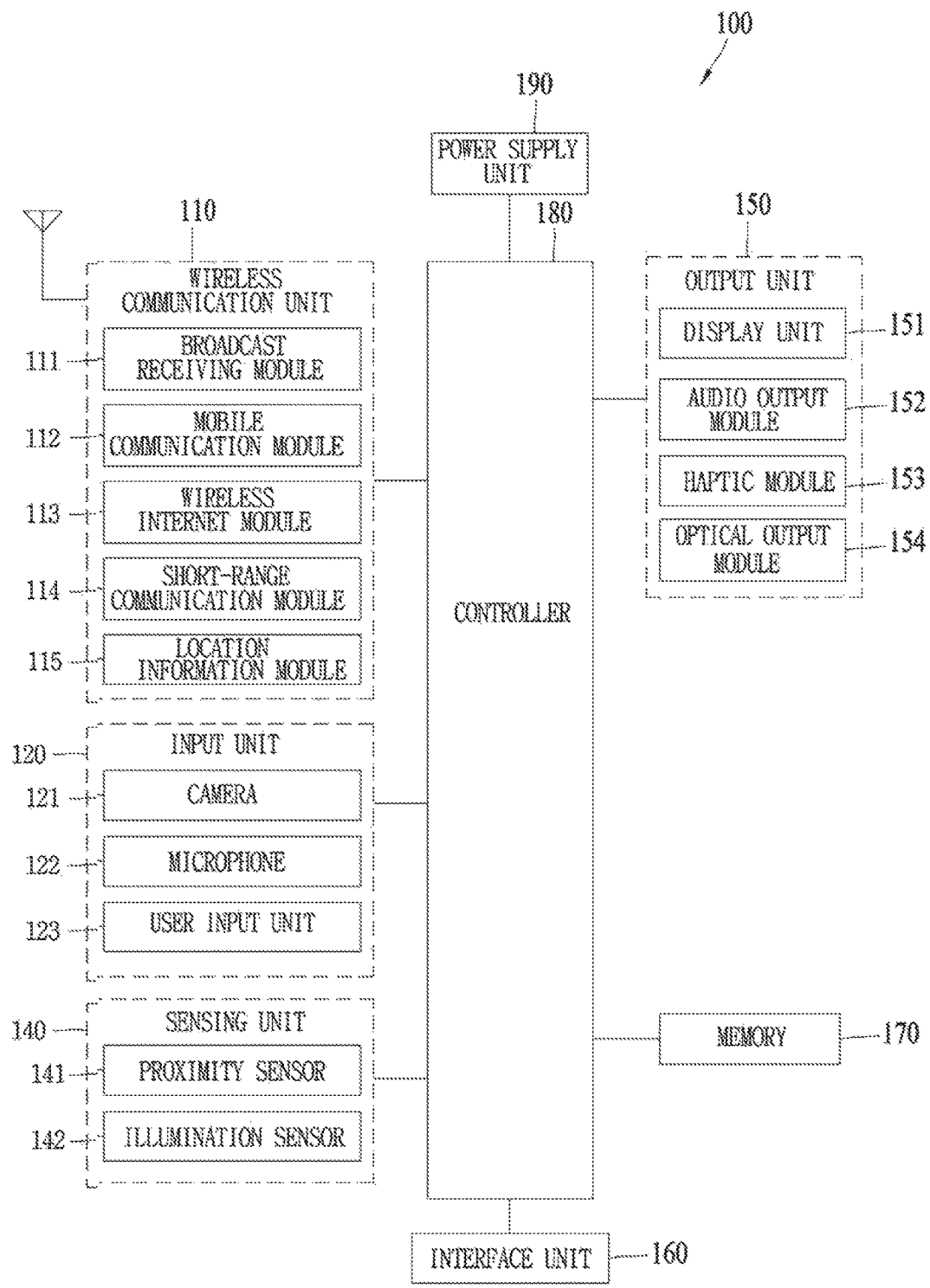
FIG. 1A is a block diagram of a mobile terminal in accordance with the present disclosure.
Figure 1B:
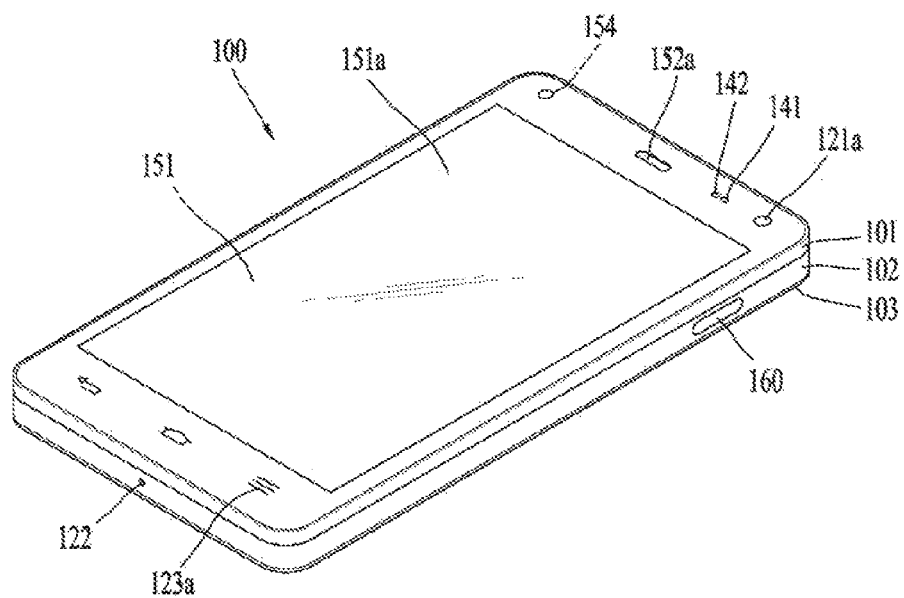
FIGS. 1B and 1C are conceptual views of one example of the mobile terminal, viewed from different directions.
Figure 1C:
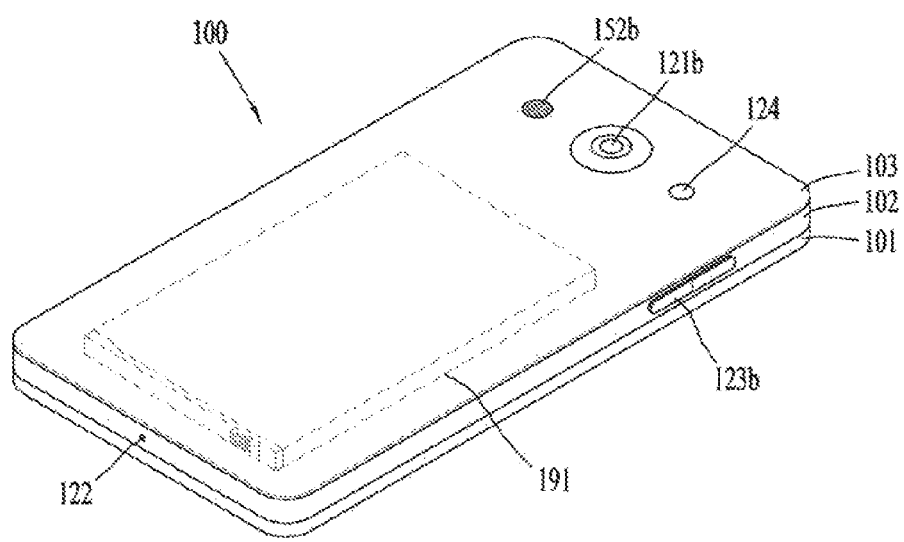

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or a function appropriate for a user by processing a signal, data, information, and the like input or output via the aforementioned configuration elements or executing an application program stored in the memory 170.

The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least a part of the aforementioned configuration elements can operate by cooperating with each other to implement an operation of a mobile terminal, a control of the mobile terminal or a method of controlling the mobile terminal according to various embodiments described in the following. And, the operation of the mobile terminal, the control of the mobile terminal or the method of controlling the mobile terminal can be implemented on the mobile terminal by executing at least one or more application programs stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages. The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

A mobile terminal 100 can include a display unit 151, a first and second audio output unit 152a/152b, a proximity sensor 141, an illumination sensor 142, an optical output unit 154, a first and a second camera 121a/121b, a first and a second operation unit 123a/123b, a microphone 122, an interface unit 160 and the like.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, according to an embodiment of the present invention, information processed by a mobile terminal can be displayed using a flexible display. This will be described in more detail with reference to the attached drawing in the following.

Figure 2:
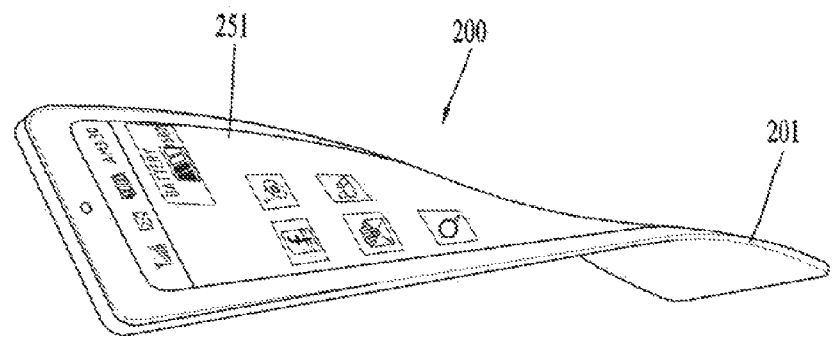
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously. The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When the flexible display unit 251 is not deformed (for example, in a state with an infinite radius of curvature and referred to as a first state), a display region of the flexible display unit 251 includes a generally flat surface. When the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized so a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state(or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140. The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor. The mobile terminal 200 is shown having a case 201 for accommodating the flexible display unit 251. The case 201 can be deformable together with the flexible display unit 251, taking into account the characteristics of the flexible display unit 251.

A battery located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 can transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
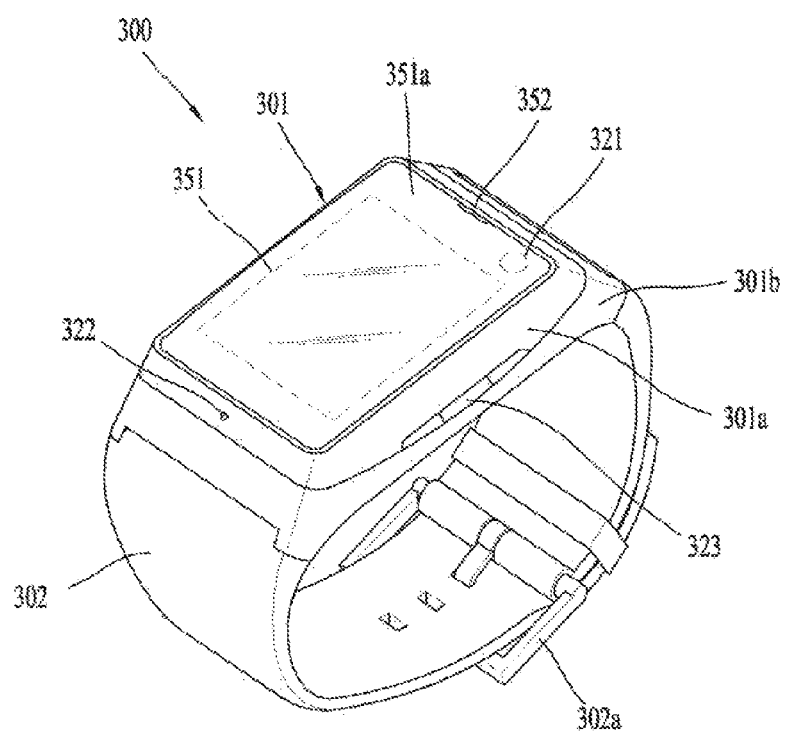
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion electrically connected to the antenna to extend a ground area. The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
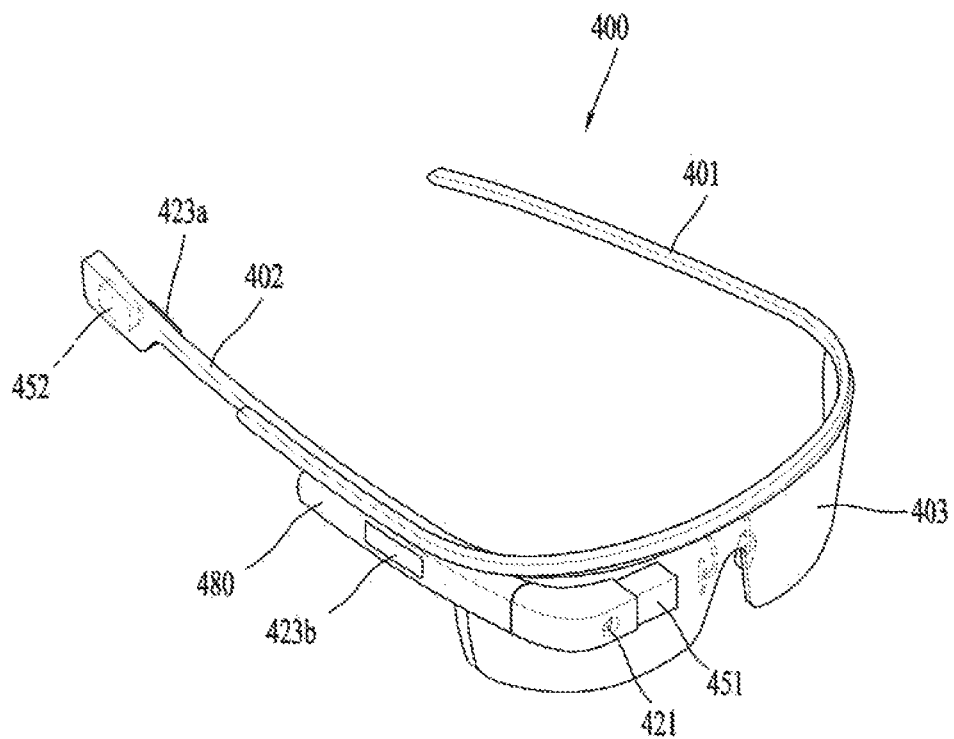
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user. In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT. Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information. The mobile terminal connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power(RSRP), reference signal received quality(RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI. Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like. The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals. The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

When the NFC module operates in a card mode, the mobile terminal may transmit card information on a general IC card to the outside. More specifically, if a mobile terminal having card information on a payment card (e.g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this instance, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof. In embodiments of FIG. 5 to FIG. 37 in the following, when a mobile terminal corresponds to a receiving device, a method of differently outputting a message, which is checked when the message is received, and a message checked later in a message interface is explained. In the embodiments of FIG. 5 to FIG. 37, operations performed by a mobile terminal can be controlled by the controller shown in FIG. 1A. For clarity, the operations are commonly depicted and explained as being performed or controlled by the mobile terminal in the following description.

Figure 5:
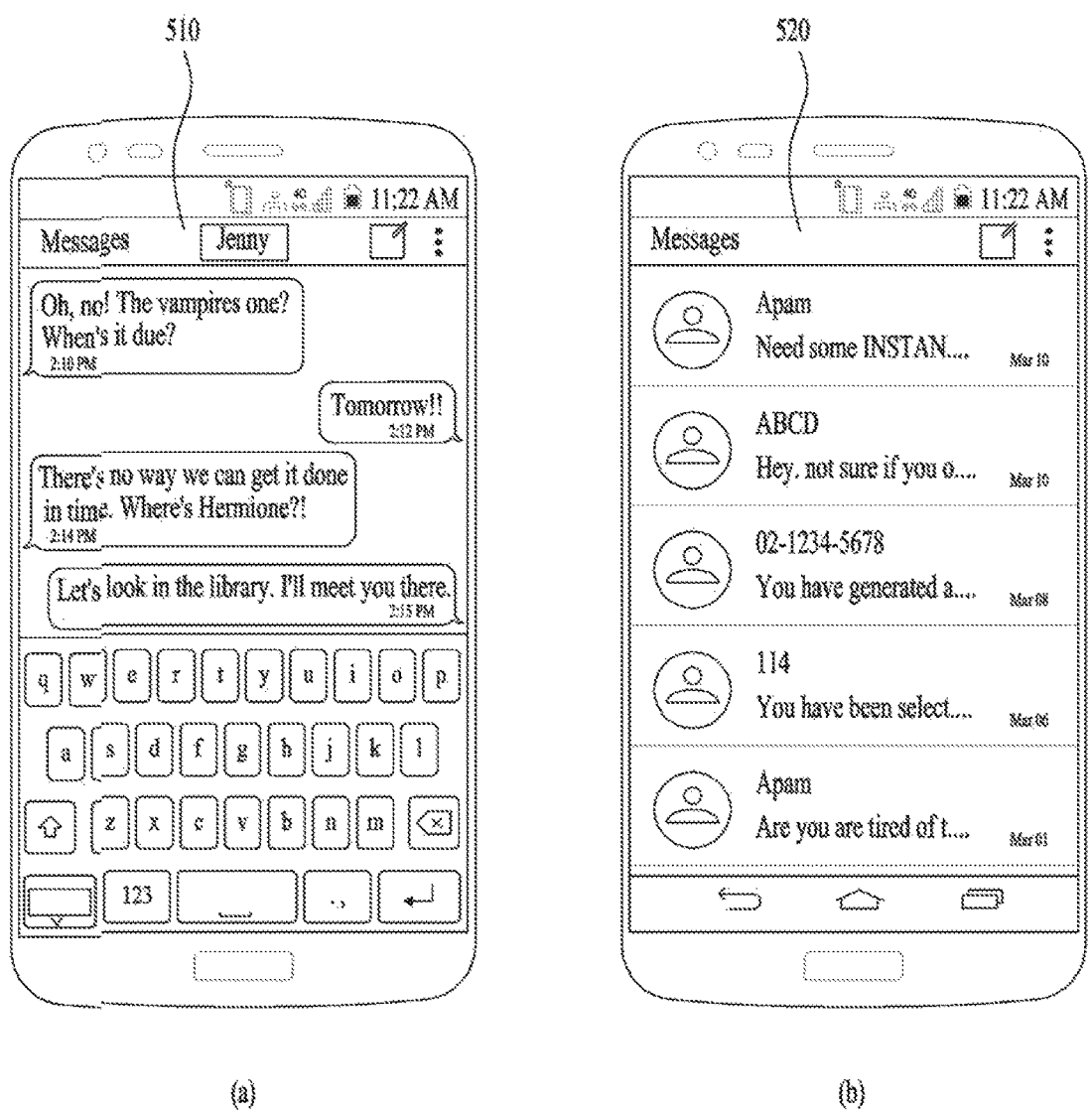
FIG. 5 is a diagram illustrating an example of a message interface of a mobile terminal related to the present invention.

FIG. 5 is a diagram illustrating an example of a message interface of a mobile terminal related to the present invention. A message interface can provide an environment capable of using a messaging service with an external device to a user using a mobile terminal. The messaging service can include both a charged service and free service. Further, the messaging service can include both a service using a mobile communication network and a service using an internet network. In particular, the messaging service is not restricted by a form and can include all types of service providing environment capable of transmitting and receiving a message by a user.

Further, the message interface can transmit and receive various forms of messages including not only a text message but also audio, an image, a video, an emoticon and the like. In the present invention, the message interface can include various message applications capable of being used in a mobile terminal.

Further, as shown in FIG. 5 (a), the message interface can provide a message history 510 including messages transceived with a different user to a user. In particular, the message interface can display a history (e.g., contents, time and the like of transceived messages) of messages transceived with an external device using a mobile terminal. For example, the message history 510 can show at least one or more messages corresponding to the messages transceived with the external device displayed in time order. Also, as shown in FIG. 5 (a), the message interface can include a virtual keyboard to enable a user to write a text message. Meanwhile, the number of an external device of a different user, which is displayed in the message history 510, may correspond to a singular number or a plural number.

Referring to FIG. 5 (b), the message interface can provide a list 520 of messages transceived between a user of a mobile terminal and different users. Unlike the aforementioned message history 510, the message list 520 can display messages transceived with a plurality of different users. For example, the message list 520 can display a name of a different user and a message among a plurality of messages transceived with the different user. In an embodiment of FIG. 5 (b), a displayed message corresponds to a recently transmitted/received message.

Figure 6:
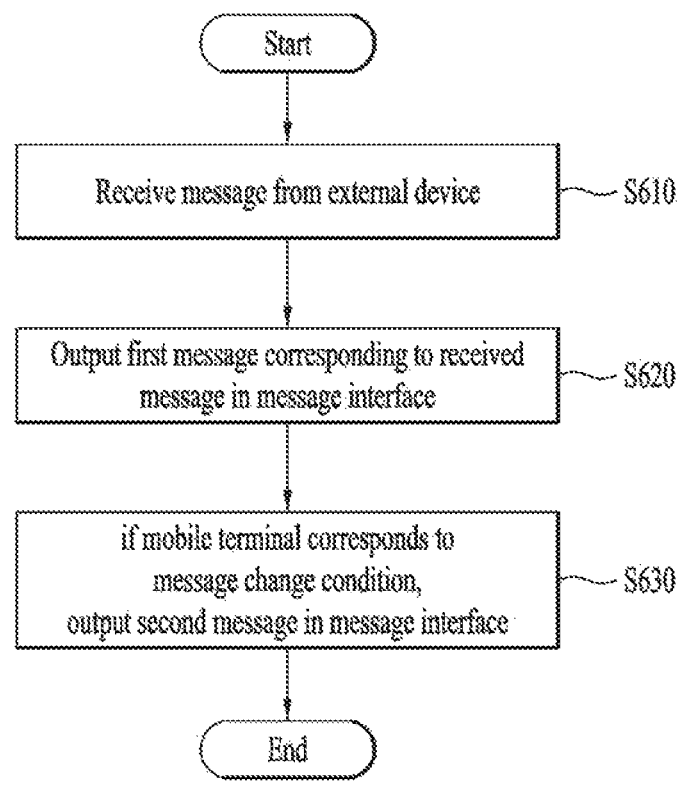
FIG. 6 is a flowchart illustrating a method of controlling a mobile terminal according to one embodiment of the present invention.

Next, FIG. 6 is a flowchart illustrating a method of controlling a mobile terminal according to one embodiment of the present invention. As shown, the mobile terminal receives a message from an external device (S610). In addition, the mobile terminal transmitting a message corresponds to a transmission device, and the mobile terminal receiving a message corresponds to a reception device. In this instance, the received message can include various contents including not only a text but also an image, audio, video, location information and the like.

In addition, the mobile terminal can output a first message corresponding to the received message in the message interface (S620). For example, the first message may correspond to a message output as it is. The first message may also correspond to a message where at least a part of the received message is output only.

In addition, if a message change condition is satisfied, the mobile terminal can output a second message in the message interface (S630). In this instance, the second message may correspond to a message having at least a part of the first message changed. Further, the message change condition may correspond to when contents included in the first message are stored. In another example, the message change condition may correspond to when a predetermined time elapses after a message is received. Also, the message change condition may correspond to when content included in the first message is executed or when predetermined content is included in the first message, and may also correspond to when an input signal input on the first message is sensed.

Since both the first message and the second message correspond to messages based on a message received from a transmission device, the first message and the second message may correspond to messages having identical metadata. In this instance, the metadata can include various information including content information of a message, information on a transmission device, transmission and reception time of a message and the like. For example, the first message and the second message may correspond to a part of the metadata of a received message output in the message interface.

Figure 7:
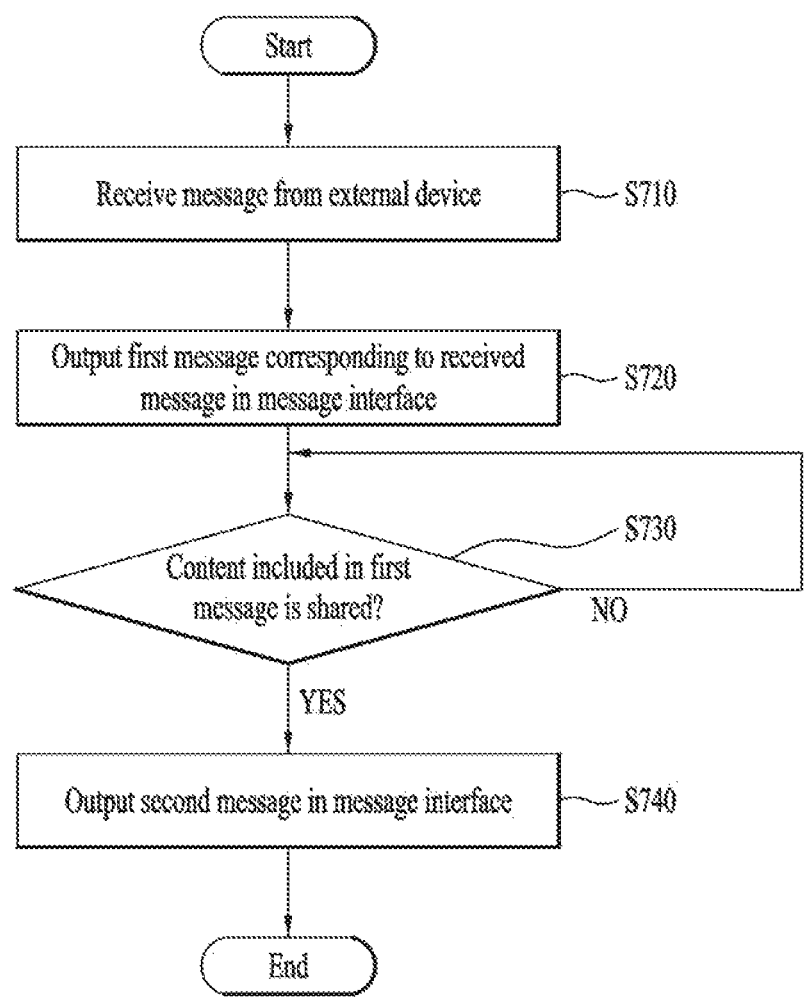
FIG. 7 is a flowchart illustrating a method of controlling a mobile terminal according to one embodiment of the present invention.

Next, FIG. 7 is a flowchart illustrating a method of controlling a mobile terminal according to one embodiment of the present invention.

As shown, the mobile terminal can receive a message from an external device (S710) and output a first message corresponding to the received message in the message interface (S720). In addition, the mobile terminal can determine whether contents included in the first message are shared (S730). For example, if the contents included in the first message are stored, the mobile terminal can determine this as the contents included in the first message are shared. In another example, if the contents included in the first message are executed, the mobile terminal can determine this as the contents included in the first message are shared.

If the contents included in the first message are shared (Yes in S730), the mobile terminal can output a second message in the message interface (S740). Also, if the contents included in the first message are shared in the step S730, the mobile terminal can delete the first message from the message interface. This will be explained with reference to FIGS. 9 and 12-15.

Figure 8:
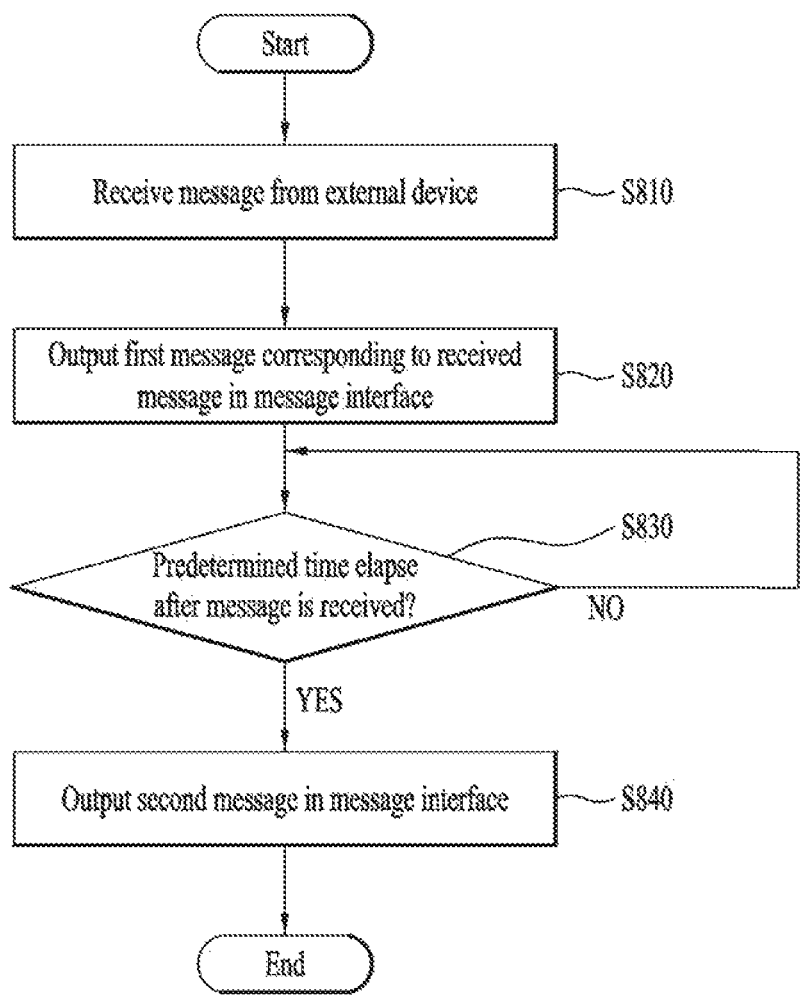
FIG. 8 is a flowchart illustrating a method of controlling a mobile terminal according to one embodiment of the present invention.

Next, FIG. 8 is a flowchart illustrating a method of controlling a mobile terminal according to one embodiment of the present invention. As shown, the mobile terminal can receive a message from an external device (S810) and output a first message corresponding to the received message in the message interface (S820).

In addition, the mobile terminal can determine whether a predetermined time elapses after the message is received (S830). For example, the predetermined time can include a time set to the message interface or a time configured by a user. If the predetermined time elapses (Yes in S830), the mobile terminal can output a second message in the message interface (S840). Also, in the step S830, if the predetermined time elapses after the message is received, the mobile terminal can delete the first message from the message interface. This will be explained again with reference to FIGS. 10 and 11.

Also, if predetermined content is included in the first message, the mobile terminal can delete the first message or output the second message. This will be explained with reference to FIGS. 17 and 19. Further, if an input signal input on the first message is sensed, the mobile terminal can delete the first message or output the second message. This will be explained with reference to FIGS. 18 and 20-24.

Figure 9:
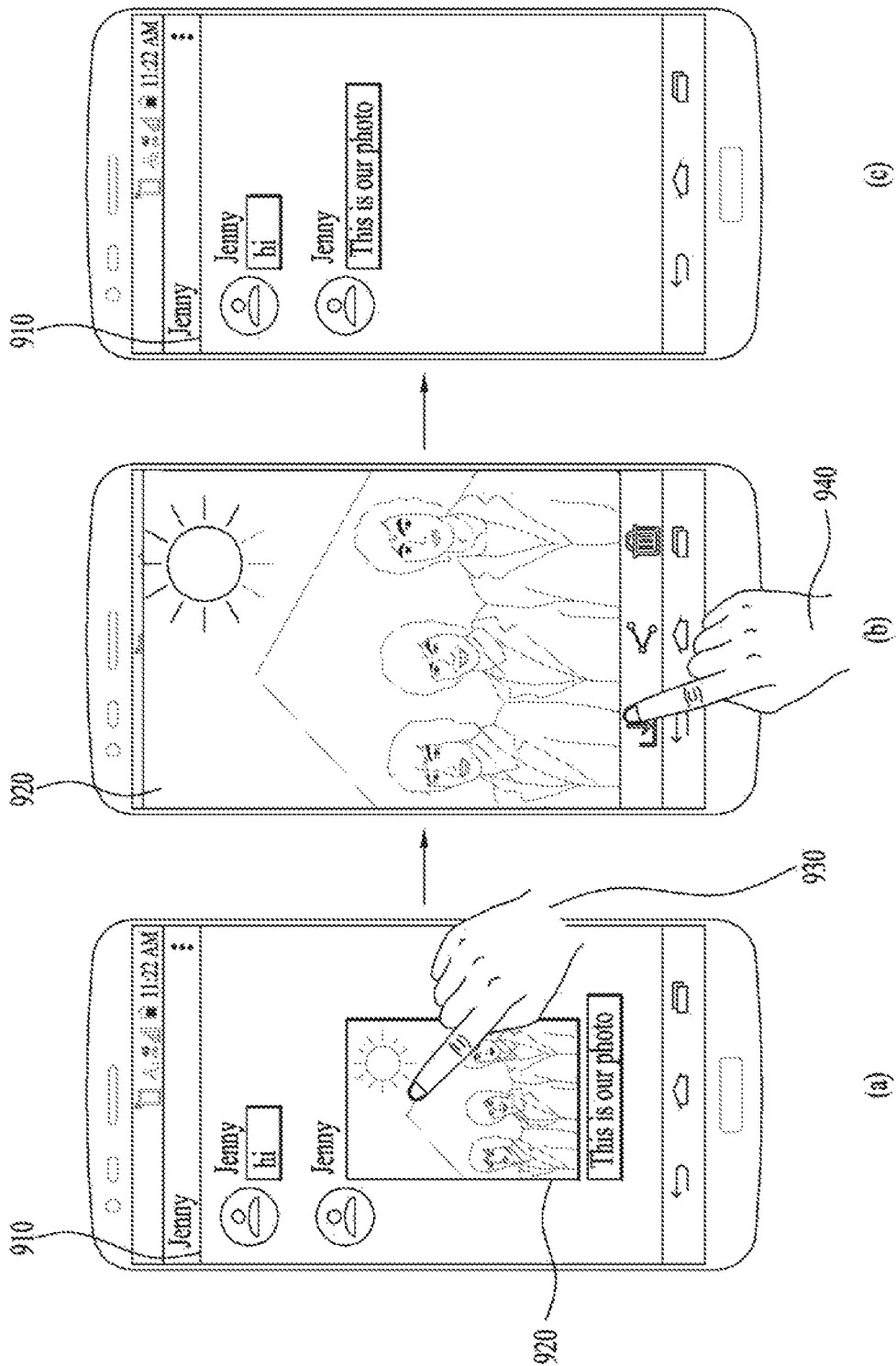
FIG. 9 is a diagram illustrating an example of outputting a received message to a message interface of the mobile terminal according to an embodiment of the present invention.

FIG. 9 is a diagram illustrating an example of outputting a received message to a message interface of the mobile terminal according to an embodiment of the present invention. More specifically, when a reception device receives a message including an image, FIG. 9 shows a method of outputting the message in an image interface. In addition, the message change condition explained in an embodiment of FIG. 9 corresponds to content included in the message being stored.

Further, the mobile terminal can display transceived messages in the message interface 910. Referring to FIG. 9 (a), the mobile terminal can display a history of messages transceived with a transmission device of a different user. In this instance, the messages received from the transmission device can include an image 920. In particular, the different user can transmit an image intended to be shared with the user of the mobile terminal. Meanwhile, the image displayed in the message history 920 may correspond to a thumbnail image that a size of an actual image is reduced.

In this instance, the mobile terminal can sense a first input signal 930 input on the image 920. The first input signal 930 can include a touch input, a gesture input and the like input on a region corresponding to the image 920 in the display unit. In the embodiment of FIG. 9 (a), the first input signal 930 corresponds to a short touch input.

As shown in FIG. 9 (b), the mobile terminal can output the image 920 in response to the first input signal 930. Further, a plurality of soft keys for the image 920 can be displayed at the bottom of the display unit. For example, as shown in FIG. 9 (b), a plurality of the soft keys including a soft key for downloading the image to the mobile terminal, a soft key for sharing the image with a different user, and a soft key for deleting the image.

Further, the mobile terminal can sense a second input signal 940 input on the soft key for downloading the image to the mobile terminal. In this instance, the second input signal 940 can include a touch input, a gesture input and the like input on a region corresponding to the soft key for download. In the embodiment of FIG. 9 (b), the second input signal 940 corresponds to a short touch input.

In this instance, the mobile terminal can store the image 920 in the mobile terminal. Further, as shown in FIG. 9 (c), the mobile terminal can delete the image 920 from the message history. The mobile terminal can also delete the image 920 from the message history when the image 920 is shared with a different user or the image is deleted.

Also, for a message history in which messages are transceived between a plurality of users, if all of the users download the image, the mobile terminal can delete the image 920 from the message history. Or, for a message history in which messages are transceived between a plurality of users, if a part of users among the plurality of the users download the image, the image can be deleted from a message history of mobile terminals which downloaded the image.

Figure 10:
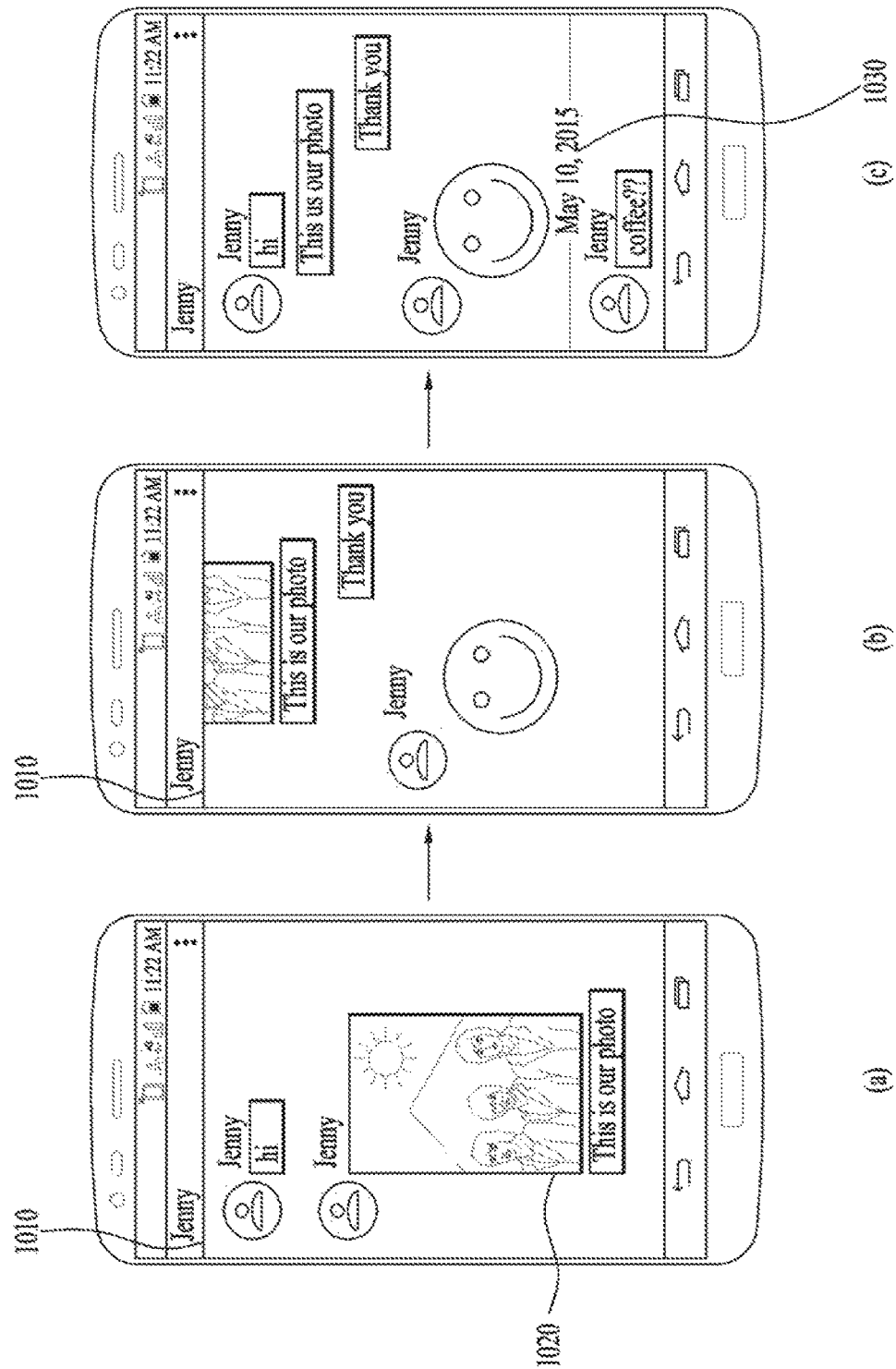
FIG. 10 is a diagram illustrating an example of outputting a received message to a message interface of the mobile terminal according to an embodiment of the present invention.

Next, FIG. 10 is a diagram illustrating an example of outputting a received message to a message interface of the mobile terminal according to an embodiment of the present invention. More specifically, when a reception device receives a message including an image, FIG. 10 shows a method of outputting the message in the message interface as time goes by. A message change condition explained in an embodiment of FIG. 10 may correspond to when a predetermined time elapses after the message is received.

The mobile terminal can display a received message in a message interface 1010. Referring to FIG. 10 (a), the mobile terminal can display a history of messages transceived with a transmission device of a different user 'Jenny' in the message interface 1010. In this instance, an image 1020 transmitted from the transmission device can be included in the message history. Referring to FIG. 10 (b), if the mobile terminal, which is a reception device, continuously transceives messages with a transmission device, the image 1020 may move to the top of the message history. In addition, the mobile terminal can delete the image 1020 displayed in the message interface 1010 when a predetermined time elapses after the message is received.

In one embodiment, the predetermined time may correspond to a specific time such as 12:00 P.M. For example, referring to FIG. 10 (c), for a message is received on 'May 9, 2015', the mobile terminal can delete the image 1020 from the message history on 'May 10, 2015', which is the day after 'May 9, 2015'. In another embodiment, the predetermined time may correspond to a time on which 10 hours have elapsed since the time of receiving a message. For example, if the image 1020 is received at 10:00 A.M., the mobile terminal can delete the image 1020 at 08:00 P.M. on the same day.

Figure 11:
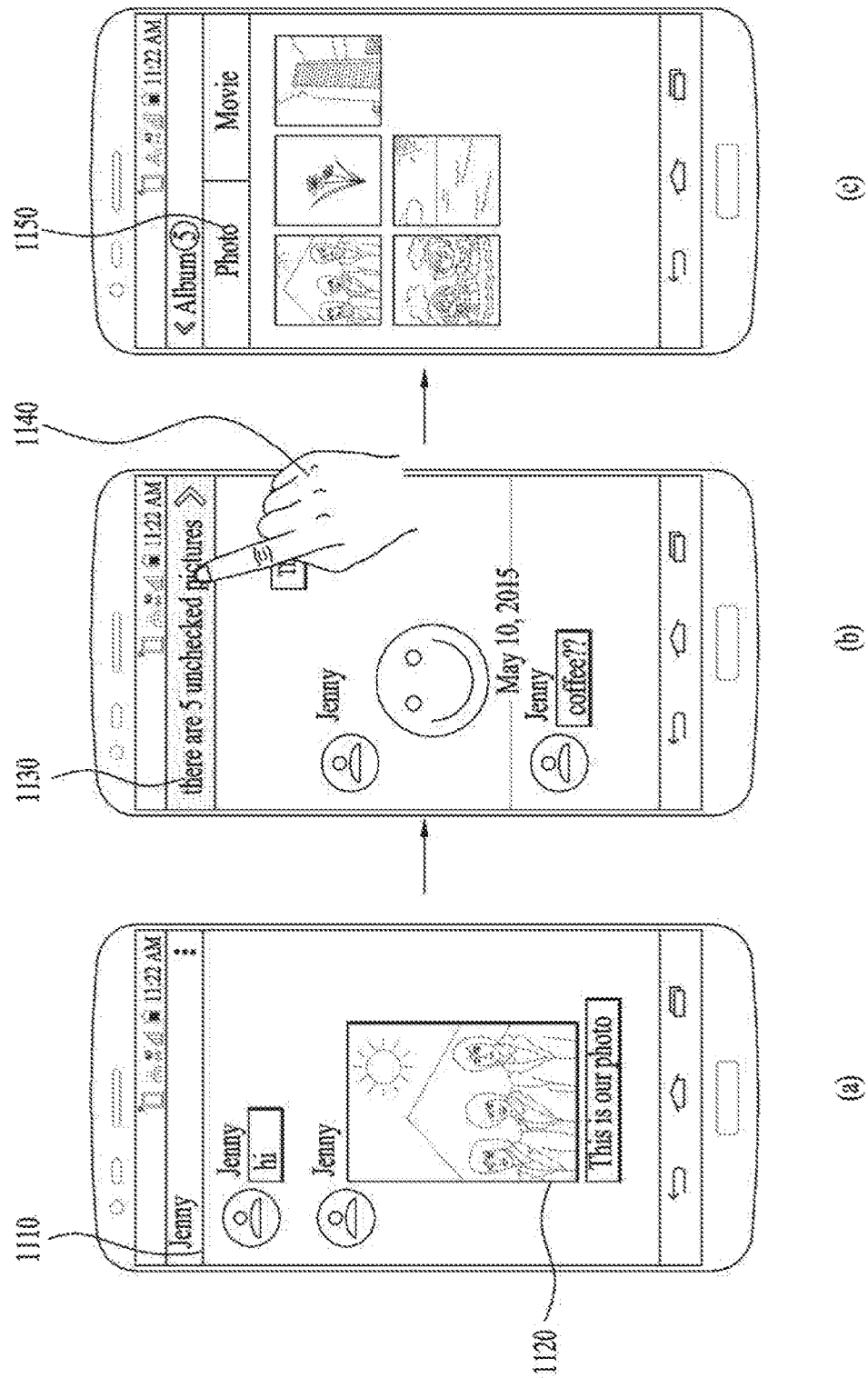
FIG. 11 is a diagram illustrating an example of outputting a received message to a message interface of the mobile terminal according to an embodiment of the present invention.

Next, FIG. 11 is a diagram illustrating an example of outputting a received message to a message interface of the mobile terminal according to an embodiment of the present invention. More specifically, when a reception device receives a message including an image, FIG. 11 shows a method of outputting an unchecked message in a message interface.

As shown in FIG. 11(a), the mobile terminal can display a received message in the message interface 1110. In this instance, the received message can include at least one or more images 1120. In addition, a predetermined time may elapse after the mobile terminal has received the image 1120 from the transmission device. For example, the predetermined time may correspond to 1 hour, by which the present invention is non-limited. Further, the mobile terminal may sense no input signal input on the image 1120 for the predetermined time. In particular, if a message including an image is received, a user may not add any input signal to a region corresponding to a position on which the image 1120 is displayed to see the image by magnifying or store the image.

As shown in FIG. 11(b), the mobile terminal deletes the image 1120 from the message interface 1110 and can display an unchecked indicator 1130 in the message interface 1110. In this instance, the image 1120 is deleted from a history of messages transceived with a sender only and a file corresponding to the image 1120 can remain in the message interface 1110.

The unchecked indicator 1130 can indicate that a message is not checked by a user among messages received from a transmission device except a text message in the message interface 1110. For example, the message except the text message can include a voice message, an image message, a video message and the like. This is because, although the text message is immediately recognized by a user via the message history, the user can check details of the voice message, the image message, the video message and the like except the text message only when the user adds an input signal to the voice message, the image message, the video message and the like.

For example, the unchecked indicator 1130 can be displayed at the top of the message indicator 1110. However, a position on which the unchecked indicator 1130 is displayed is non-limited by a specific position within the message interface 1110. Further, the unchecked indicator 1130 can be displayed in a bar form, by which the present invention is non-limited.

In addition, as shown in FIG. 11(b), the mobile terminal can sense an input signal 1140 input on the unchecked indicator 1130. The input signal 1140 can include a touch input, a gesture input and the like input on a region corresponding to the unchecked indicator 1130 in the display unit.

As shown in FIG. 11(c), the mobile terminal can display an album 1150 corresponding to a counterpart of conversation performed in the message interface 1110. For example, the album 1150 may correspond to lower content of the message interface 1110. Further, the album 1150 may correspond to a different album application instead of the message interface 1110. Thus, a user can easily check messages unchecked in the message history except a text message in the future.

Also, messages can be transceived with each other between a plurality of users in the message history. In this instance, if a user among a plurality of the users transmits a message including an image, the image can be immediately deleted from a message history of a device of a user who has checked and stored the image. Further, a unchecked indicator can be displayed on a device of a user who has not checked the image among a plurality of the users after predetermined time elapsed.

Figure 12:
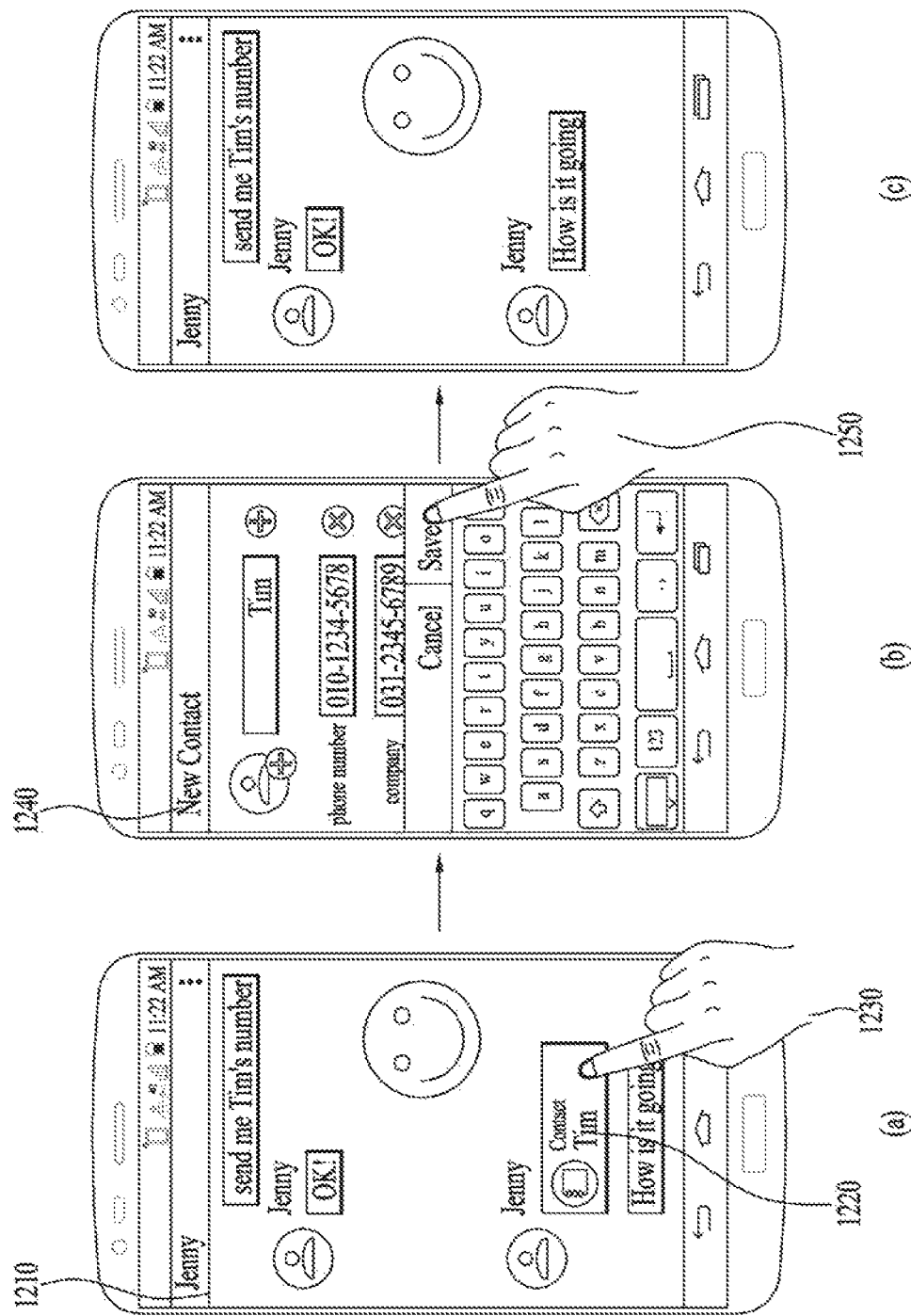
FIG. 12 is a diagram illustrating an example of outputting a received message to a message interface of the mobile terminal according to an embodiment of the present invention.

Next, FIG. 12 is a diagram illustrating an example of outputting a received message to a message interface of the mobile terminal according to an embodiment of the present invention. More specifically, when a reception device receives a message including contact information, FIG. 12 shows a method of outputting the message in a message interface. A message change condition explained in an embodiment of FIG. 12 corresponds to when content included in the message is stored.

The mobile terminal receives a message 1220 including contact information from a transmission device and can output the message in a message interface 1210. In the embodiment of FIG. 12 (a), a counterpart receives a request for contact information of 'Tim' from a user and can provide the contact information of 'Tim' to the user. In this instance, the message 1220 including the contact information can include a contact name and number.

Further, as shown in FIG. 12 (a), the mobile terminal can sense a first input signal 1230 input on the message 1220 including the contact information. The first input signal 1230 can include a touch input, a gesture input and the like input on a region corresponding to the message 1220 in the display unit.

As shown in FIG. 12 (b), the mobile terminal can execute a contact add interface 1240. In particular, the mobile terminal can be connected to the contact add interface 1240, whereas there is no separately connected interface when a first input signal 1230 input on a text message is sensed. The mobile terminal then executes a contact interface and a message interface by multitasking and can display the contact add interface on the display unit. Further, a user can store contact information included in a message, which is received from a counterpart, in the mobile terminal.

In addition, as shown in FIG. 12 (b), after contact information is ready, the mobile terminal can sense a second input signal 1250 input on a save button. In this instance, the mobile terminal stores the contact information, terminates a contact application and can display a message application 1240 again. As shown in FIG. 12 (c), the mobile terminal can delete the message including the contact information from the message history.

If an input signal input on the message 1220 in which the contact information is included is not sensed for predetermined time, the mobile terminal can delete the message 1220 in which the contact information is included from the message history. That is, since the contact information corresponds to personal information, it is preferable to protect the personal information although a user of the mobile terminal does not store the contact information.

Figure 13:
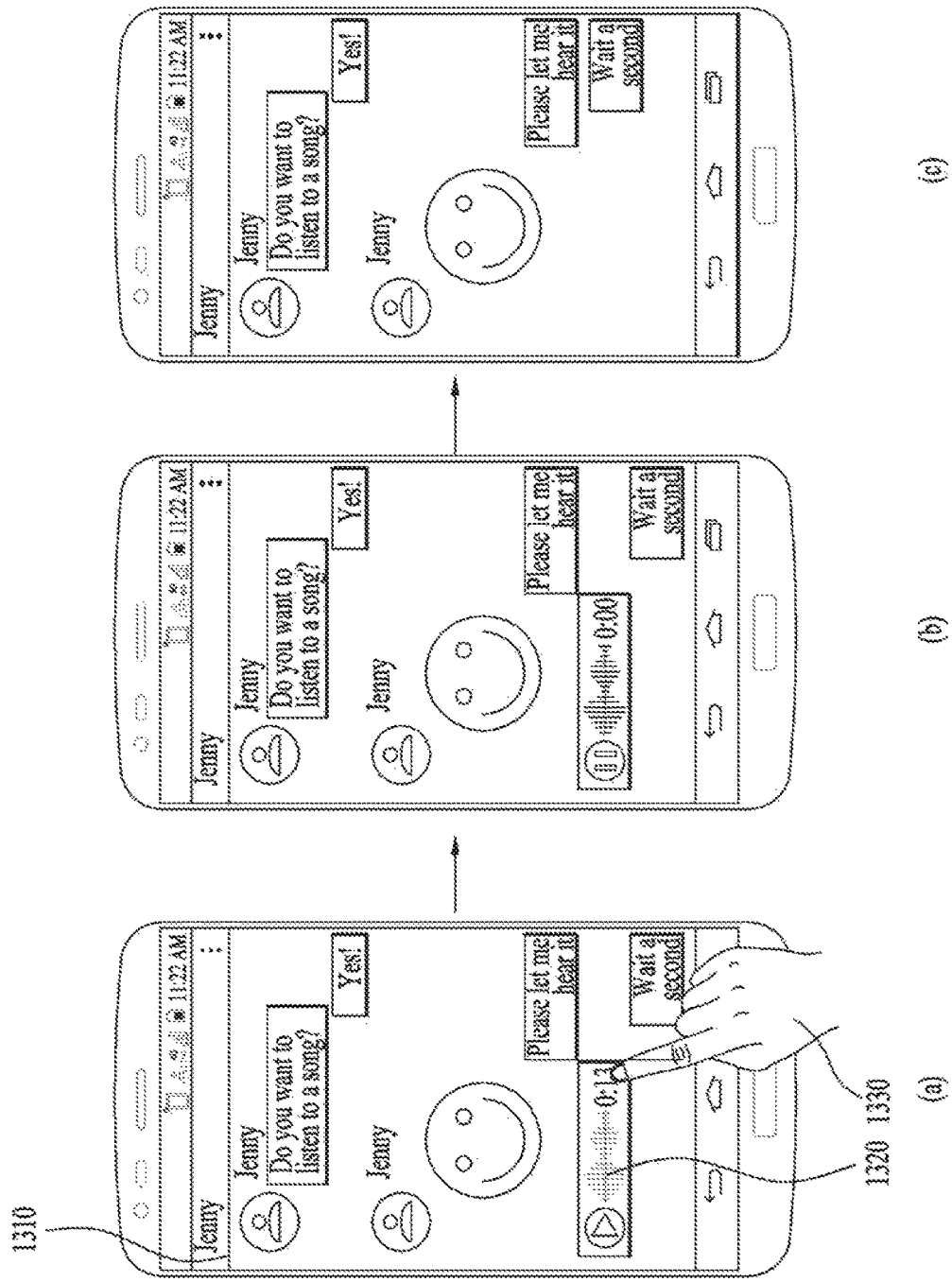
FIG. 13 is a diagram illustrating an example of outputting a received message to a message interface of the mobile terminal according to an embodiment of the present invention.

Next, FIG. 13 is a diagram illustrating an example of outputting a received message to a message interface of the mobile terminal according to an embodiment of the present invention. More specifically, when a reception device receives a voice message, FIG. 13 shows a method of outputting the voice message in an image interface. A message change condition explained in an embodiment of FIG. 13 corresponds to when content included in a message is executed. For example, executing a voice message may correspond to playing the voice message.

The mobile terminal receives a voice message 1320 from a transmission device and can output the voice message in a message interface 1310. In an embodiment of FIG. 13 (a), a counterpart transmits a voice message 1320 to a user. Further, the mobile terminal can sense an input signal 1330 input on the voice message 1320. The input signal 1330 can include a touch input, a gesture input and the like input on a region corresponding to the voice message 1320 in the display unit.

As shown in FIG. 13 (b), the mobile terminal can play the voice message 1320. For example, the mobile terminal can play the voice message 1320 using a lower content included in the message interface 1310 when the message interface 1310 is displayed without executing a separate voice playback application. Further, the mobile terminal can play voice by executing the separate voice playback application together with the message interface 1310 by multitasking.

As shown in FIG. 13 (c), if the playback of the voice message 1320 is completed, the mobile terminal can delete the voice message 1320 from the message history. Also, if a part of the voice message 1320 is played only and the total play of the voice message is not completed by an additional input signal, the mobile terminal can maintain the voice message 1320 in the message history.

Figure 14:
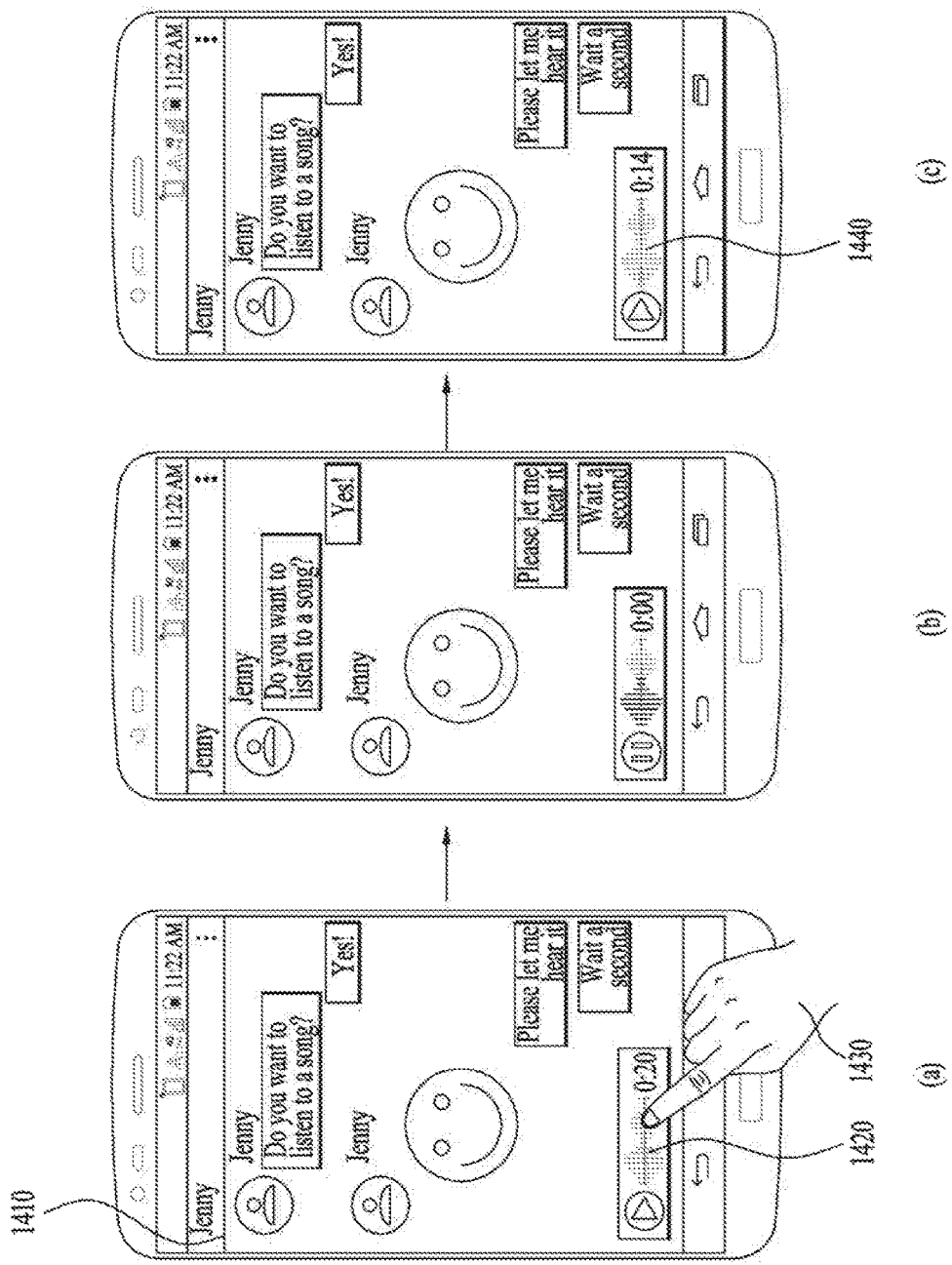
FIG. 14 is a diagram illustrating an example of outputting a voice message by editing the voice message in a message interface in embodiment of FIG. 13.

FIG. 14 is a diagram illustrating an example of outputting a voice message by editing the voice message in a message interface in the embodiment of FIG. 13. As shown in FIG. 14 (a), the mobile terminal can sense a first input signal input on a voice message 1420. Further, the voice message 1420 can include a secret voice message configured by a transmission device, and the secret voice message may correspond to a part of the voice message 1420. For example, if the voice message 1420 has an amount of 20 seconds, the secret voice message may correspond to an amount of 6 seconds.

As shown in FIG. 14 (b), the mobile terminal can play the voice message 1420. In addition, if the total of the voice message 1420 is played, the mobile terminal can display a message 1440 that a part of the voice message is deleted. In particular, as shown in FIG. 14 (c), the mobile terminal can output the voice message 1440 of 14 seconds that the secret voice message of the amount of 6 seconds is deleted from the total voice message 1420 in the message history. The aforementioned embodiments of FIG. 13 and FIG. 14 applied to voice contents can be identically applied to video content as well.

Figure 15:
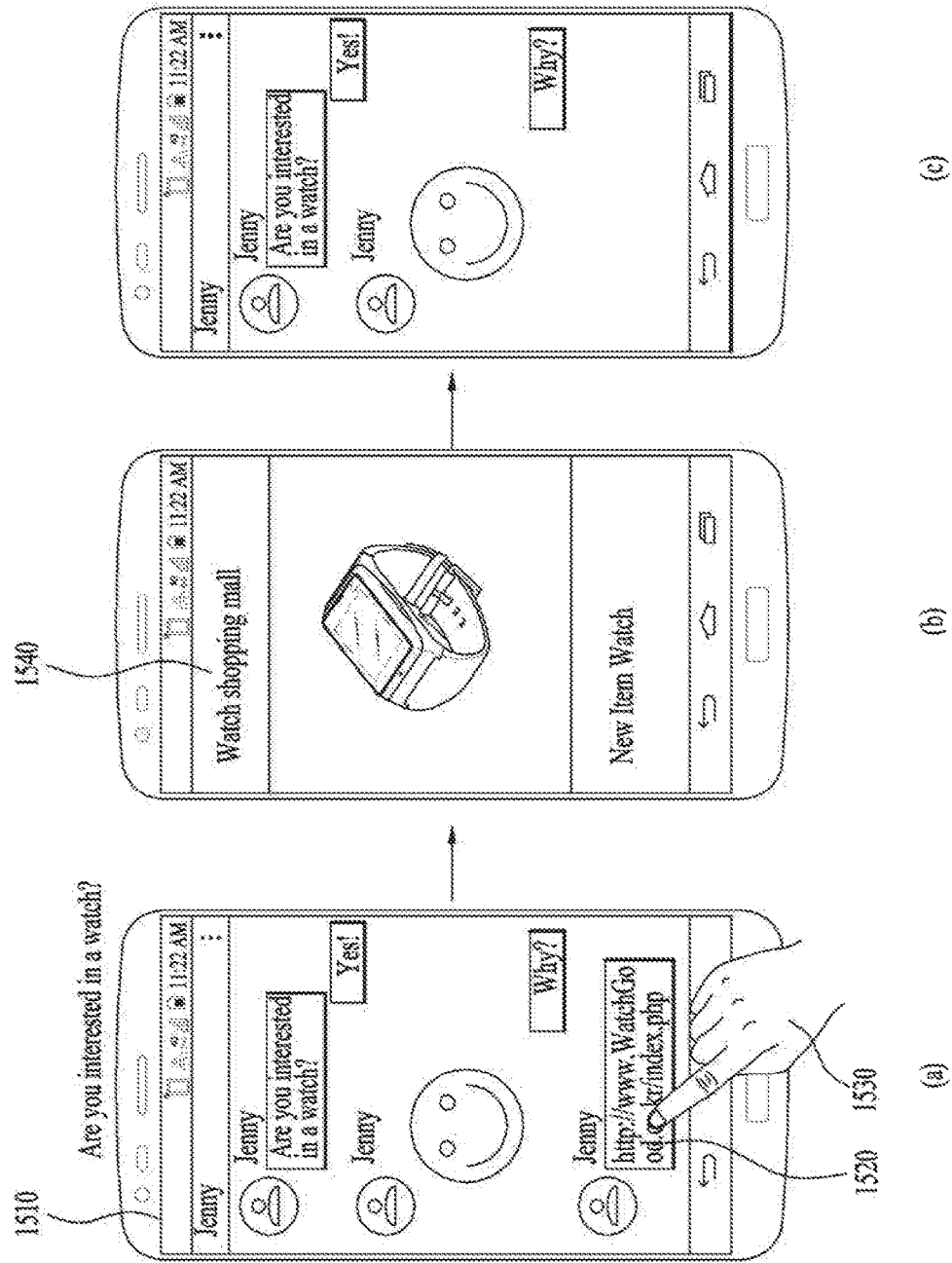
FIG. 15 is a diagram illustrating an example of outputting a received message to a message interface of the mobile terminal according to an embodiment of the present invention.
Figure 16:
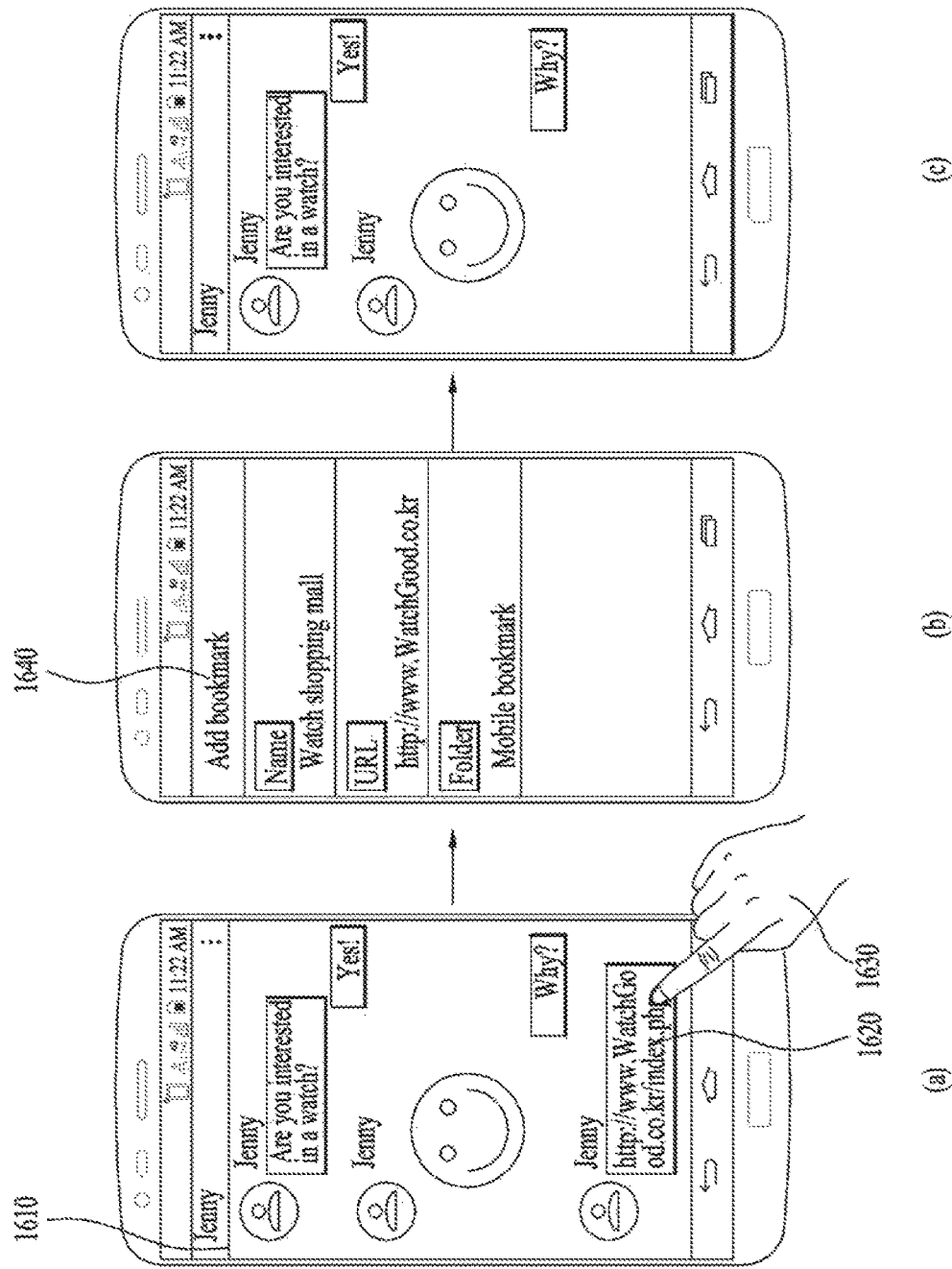
FIG. 16 is a diagram illustrating an example of outputting a received message to a message interface of the mobile terminal according to an embodiment of the present invention.

Next, FIGS. 15 and 16 illustrate a method of outputting a message when receiving a message including a web link in a message interface. Assume that an input signal of FIG. 15 and an input signal of FIG. 16 are different from each other. For example, if the input signal of FIG. 15 corresponds to a short touch input, the input signal of FIG. 16 may correspond to a long touch input.

FIG. 15 is a diagram illustrating an example of outputting a received message to a message interface of the mobile terminal according to an embodiment of the present invention. More specifically, when a reception device receives a message including a web link, FIG. 15 shows a method of outputting the message in an image interface. In this instance, the web link may indicate an address of a web page. A message change condition explained in an embodiment of FIG. 15 may correspond to when content included in a message is executed.

As shown in FIG. 15 (a), the mobile terminal receives a message 1520 including a web link from a transmission device and can output the message in a message interface 1510. Further, the mobile terminal can sense an input signal 1530 input on the message 1520 in which the web link is included. The input signal 1530 can include a touch input, a gesture input and the like input on a region corresponding to the message 1520 in the display unit.

As shown in FIG. 15 (b), the mobile terminal displays the message interface 1510 and a web page interface by multitasking and can display a web page 1540 corresponding to the web link. For example, if the web page 1540 is displayed, the mobile terminal can add the web link as a bookmark by sensing an additional input signal from a user. If the web page 1540 is displayed, the mobile terminal captures the web page and stores the web page in the mobile terminal by sensing an additional input signal from a user.

If the use of the web page is terminated, the mobile terminal can display the message interface 1510 again. As shown in FIG. 15 (c), the mobile terminal can delete the message 1520 including the web link from the message history. Meanwhile, for a message history in which messages are transceived between a plurality of users, if an input signal input on a web link is not received in a mobile terminal, the mobile terminal can maintain the message 1520 including the web link.

FIG. 16 is a diagram illustrating an example of outputting a received message to a message interface of the mobile terminal according to an embodiment of the present invention. More specifically, when a reception device receives a message including a web link, FIG. 16 shows a method of outputting the message in an image interface. A message change condition explained in an embodiment of FIG. 16 may correspond to when content included in a message is stored.

As shown in FIG. 16 (a), the mobile terminal receives a message 1620 including a web link from a transmission device and outputs the message in a message interface 1610. Further, the mobile terminal can sense an input signal 1630 input on the message 1620 in which the web link is included. As mentioned in the foregoing description, the input signal 1630 of FIG. 16 may correspond to an input signal different from the input signal of FIG. 15.

As shown in FIG. 16 (*b*), the mobile terminal performs the message interface 1610 and a web page interface by multitasking and can display a bookmark add page 1640 corresponding to the web link. Further, when the bookmark for the web link is completed, the mobile terminal can display the message interface 1610 again. As shown in FIG. 16 (*c*), the mobile terminal can delete the message 1620 including the web link from the message history.

Figure 17:
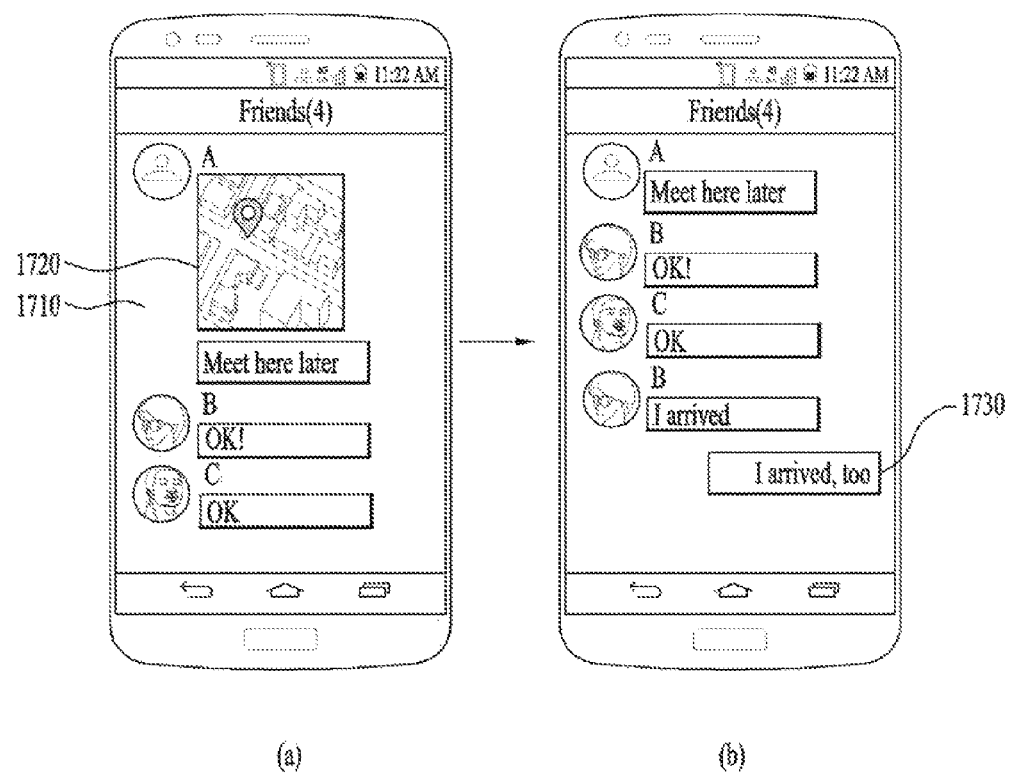
FIG. 17 is a diagram illustrating an example of outputting a received message to a message interface of the mobile terminal according to an embodiment of the present invention.

FIG. 17 is a diagram illustrating an example of outputting a received message to a message interface of the mobile terminal according to an embodiment of the present invention. More specifically, when a plurality of users transceive messages with each other in a message history, FIG. 17 shows a method of outputting a message in a message interface. A message change condition explained in an embodiment of FIG. 17 corresponds to when a message added to a message history after a message is received includes predetermined contents.

As shown in FIG. 17 (*a*), the mobile terminal receives a message 1720 in which a map is included from a transmission device and displays the message in a message interface 1710. For example, the message 1720 in which the map is included may correspond to a message transmitted by at least one user among a plurality of users.

In this instance, the mobile terminal can determine whether to delete the message 1720 in which the map is included from the message history. In one embodiment, as shown in FIG. 17 (*b*), the mobile terminal can recognize such a message 1730 as 'I've just arrived' input by a user in the message interface. Further, the mobile terminal determines this as the user has used the message 1720 in which the map is included based on the message 1730 input by the user and can then delete the message 1720 in which the map is included from the message history.

In another embodiment, the mobile terminal can recognize a location shown in the message 1720 in which the map is included in the message interface. Further, if it is determined as a location corresponds to the location shown in the message 1720 in which the map is included using a GPS sensor and the like mounted on the mobile terminal, the mobile terminal can delete the message from the message history.

Further, in another embodiment, as shown in FIG. 17 (*b*), the mobile terminal can recognize contents related to 'arrival' not only from a user in the message interface but also from messages of a plurality of users included in the message history. If 'arrival' messages of a plurality of the users are recognized, the mobile terminal can delete the message 1720 in which the map is included from the message history.

Figure 18:
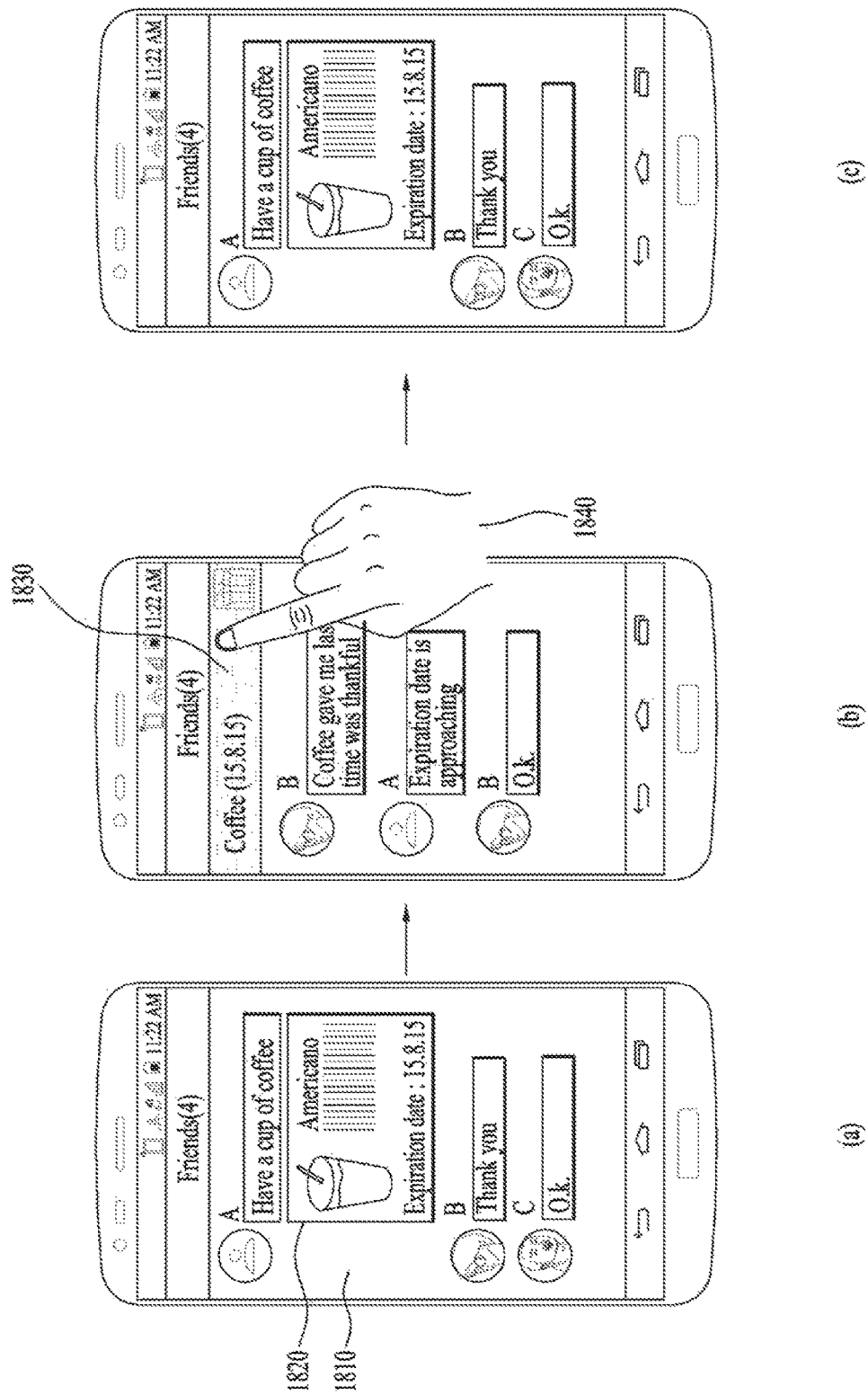
FIG. 18 is a diagram illustrating an example of outputting a received message to a message interface of the mobile terminal according to an embodiment of the present invention.

FIG. 18 is a diagram illustrating an example of outputting a received message to a message interface of the mobile terminal according to an embodiment of the present invention. More specifically, when a plurality of users transceive a product exchange message with each other in a message history, FIG. 18 shows a method of outputting a message in a message interface.

As shown in FIG. 18 (*a*), the mobile terminal receives a product exchange message 1820 from a transmission device and can display the message in a message interface 1810. The product exchange message corresponds to a message in which a ticket or a coupon for exchanging a product is included. The product exchange message can include a serial number, a QR code, a bar code and the like. Hence, if a user shows the product exchange message 1820 to a purchasing place, the user can purchase the product without paying any money.

When messages are continuously transceived with each other between a plurality of users after the product exchange message 1820 is received, it is difficult to check the product exchange message 1820 in the message history. As shown in FIG. 18 (*b*), the mobile terminal can display a product exchange indicator 1830 indicating that the product exchange message 1820 is included in the message history and can be fixed on a prescribed position of the message interface 1810. Hence, although messages are increasing in the message history, a user can recognize whether the product exchange message 1820 exists in the message history via the product exchange indicator 1830.

In this instance, the mobile terminal can sense an input signal 1840 input on the product exchange indicator 1830. The input signal 1840 can include a touch input, a gesture input and the like input on a region corresponding to the product exchange indicator 1830 in the display unit.

Further, as shown in FIG. 18 (*c*), the mobile terminal can move to a position in which the product exchange message 1820 is output in the message history according to the input signal 1840. Hence, although the product exchange message 1820 is not output in the message history, a user can easily use a coupon or a ticket included in the product exchange message 1820.

Further, if the coupon or the ticket included in the product exchange message 1820 is used by a user of the mobile terminal or a user using a different mobile terminal, the product exchange indicator 1830 can be deleted. Further, if a validity period of the coupon or the ticket included in the product exchange message 1802 expires, the product exchange indicator 1830 can be deleted.

Figure 19:
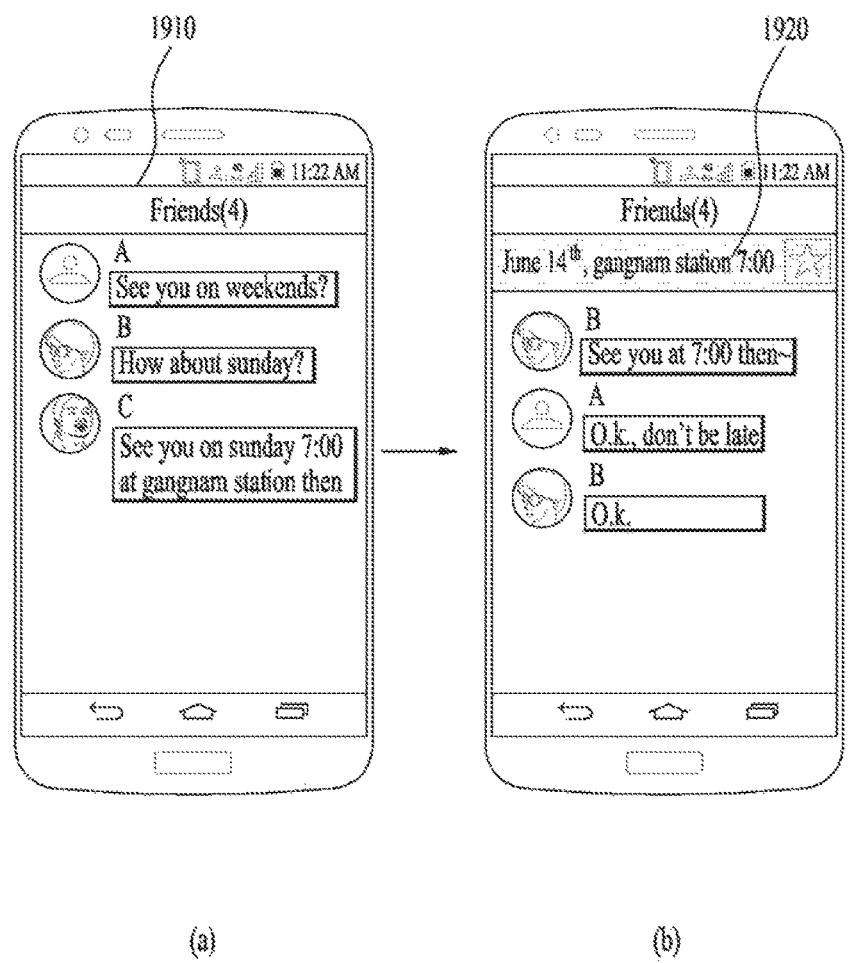
FIG. 19 is a diagram illustrating an example of outputting a received message to a message interface of the mobile terminal according to an embodiment of the present invention.

Next, FIG. 19 is a diagram illustrating an example of outputting a received message to a message interface of the mobile terminal according to an embodiment of the present invention. More specifically, when a plurality of users transceive a message with each other in a message history, FIG. 19 shows a method of outputting a message in a message interface. A message change condition explained in an embodiment of FIG. 19 corresponds to when content included in a message is displayed in a predetermined area.

As shown in FIG. 19 (*a*), the mobile terminal can receive not only a message generated by a user of the mobile terminal but also a message on a schedule from a plurality of users included in a message history. In this instance, the mobile terminal identifies contents of the message and can then recognize an appointment time of a plurality of the users. For example, referring to FIG. 19 (*a*), the mobile terminal can recognize the appointment time from a last message in which content related to time is included in the message history.

As shown in FIG. 19 (*b*), the mobile terminal can display a schedule indicator 1920 based on the recognized time. The schedule indicator 1920 indicates a time for a meeting of a plurality of the users. The schedule indicator can be displayed on a predetermined position of the display unit. For example, the predetermined position corresponds to the top part of the message interface 1910.

In addition, if additional messages are transceived in the message history and time related to a schedule is included in contents of the additional messages, the mobile terminal can change content of the schedule indicator 1920 based on time information included in a lastly output message. Further, if a time written on the schedule indicator 1920 elapses, the mobile terminal can delete the schedule indicator 1920 from the message interface.

Figure 20:
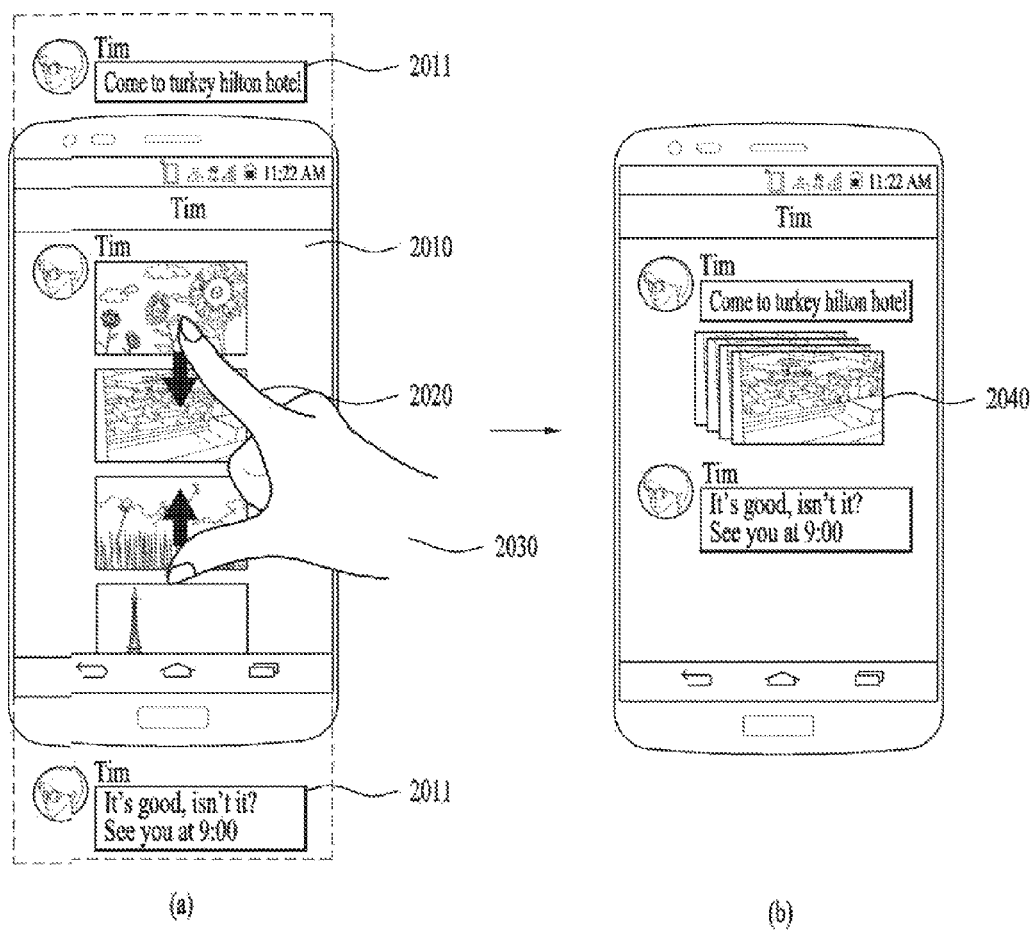
FIG. 20 is a diagram illustrating an example of outputting a received message to a message interface of the mobile terminal according to an embodiment of the present invention.

Next, FIG. 20 is a diagram illustrating an example of outputting a received message to a message interface of the mobile terminal according to an embodiment of the present invention. More specifically, when a message including a plurality of images is transceived in a message history, FIG. 20 shows a method of outputting the message in a message interface. A message change condition explained in an embodiment of FIG. 20 corresponds to sensing an input signal input on a message.

As shown in FIG. 20 (*a*), the mobile terminal receives a message 2020 in which a plurality of images are included from a transmission device and can display the message in a message interface 2010. For example, the mobile terminal continuously receives four images and can display the images in the message interface 2010. In this instance, since a space of the message interface 2010 is limited, if a plurality of images are displayed in the message interface, it is difficult for a user to check a text message 2011 transceived before and after a message in which a plurality of the images are included.

In this instance, the mobile terminal can sense an input signal 2030 input on the message 2020 in which a plurality of the images are included. As shown in FIG. 20 (*a*), the input signal 2030 corresponds to a pinch-in input on a region corresponding to the message in which a plurality of the images are included. In this instance, the pinch-in input corresponds to a drag touch input of which two input signals sensed at the same time move in a direction closed to each other.

In addition, as shown in FIG. 20 (*b*), the mobile terminal can output a changed message 2040 of the message in which a plurality of the images are included in the message interface 2010. For example, the changed message 2040 corresponds to a message in which a plurality of the images are displayed by being overlapped with each other. In this instance, an image displayed at the front side of the changed message 2040 corresponds to a first image or a last image of a plurality of the images. Further, as shown in FIG. 20 (*b*), if the message 2020 in which a plurality of the images are included is output by being changed to the changed message 2040, the controller 180 can display the text 2011 transceived before and after the images in the message interface 2010.

Further, if a predetermined time elapses after the message 2020 in which a plurality of the images are included is received, the mobile terminal can display the changed message 2040 in the message interface 2010. In addition, if an input signal input on the changed message 2040 is sensed, the mobile terminal can display a plurality of the images by unfolding a plurality of the images again.

Figure 21:
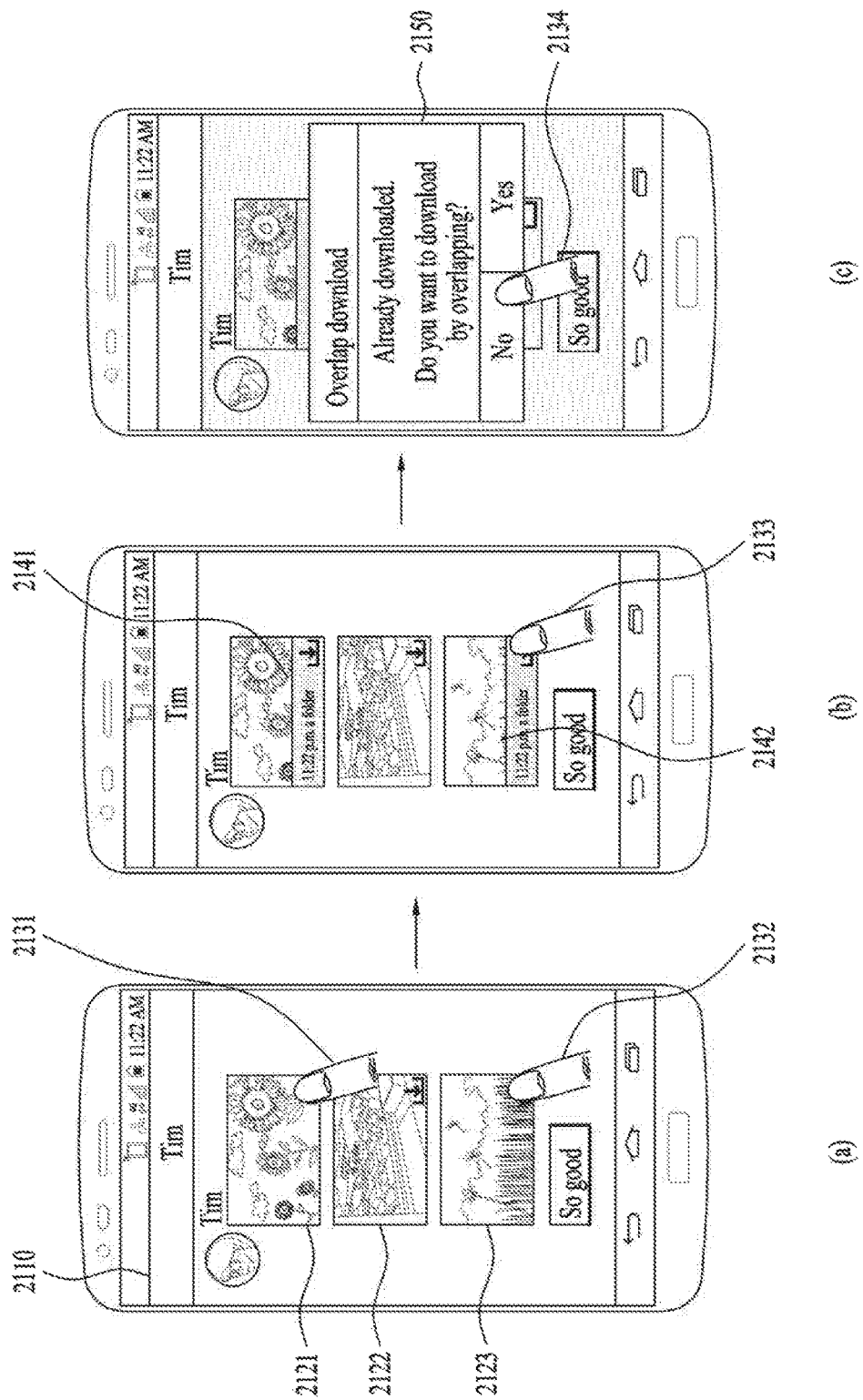
FIG. 21 is a diagram illustrating an example of outputting a message in an image interface when receiving a message including an image in a mobile terminal related to the present invention.
Figure 22:
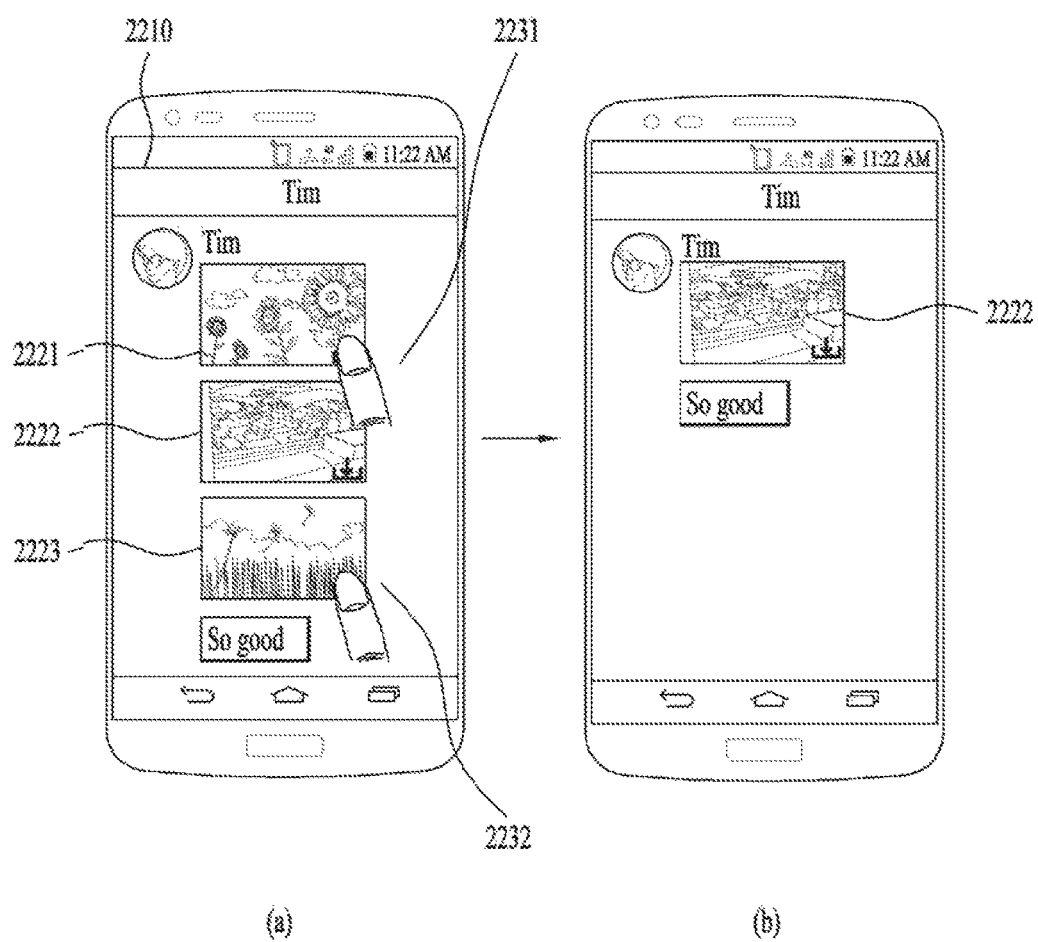
FIG. 22 is a diagram illustrating an example of outputting a message in an image interface when receiving a message including an image in a mobile terminal related to the present invention.

Next, FIGS. 21 and 22 illustrate an example of outputting a message in an image interface when the mobile terminal related to the present invention receives a message including images. When the mobile terminal receives a message in which images are included, FIG. 21 shows a method of outputting the message by changing the message as the images are stored. A message change condition explained in an embodiment of FIG. 21 corresponds to when the images included in the message are stored.

As shown in FIG. 21(*a*), the mobile terminal receives a message in which a plurality of images 2121/2122/2123 are included and can output the message in a message interface 2110. In this instance, a plurality of the images 2121/2122/2123 corresponds to thumbnail images of actual images. Further, an image download indicator can be displayed in each of a plurality of the images 2121/2122/2123.

In addition, referring to FIG. 21(*a*), the mobile terminal can sense first input signals 2131/2132 input on the image 2121 and the image 2123, respectively. The input signals 2131/2132 can include a touch input, a gesture input and the like input on a region corresponding to the image download indicator included in each image. Further, the first input signal corresponds to a contiguous input on each image.

In this instance, the mobile terminal can store an image corresponding to the image 2121 and an image corresponding to the image 2123. Further, as shown in FIG. 21(*b*), the mobile terminal can display a download complete indicator 2141/2142 indicating completion of downloading in response to the image 2121/2123. For example, the download complete indicator 2142/2142 corresponds to a graphic effect provided to each thumbnail image. In particular, the mobile terminal can blurredly display an image of which download is completed. In addition, the download complete indicator 2141/2142 corresponds to download information of an image displayed in a region of each thumbnail image. The download information can include the time taken for downloading, a downloaded device and the like.

As shown in FIG. 21(*b*), the mobile terminal can sense a second input signal 2133 input on the image 2123. The second input signal 2133 can include a touch input, a gesture input and the like input on a region corresponding to a download indicator of the image 2123. Further, as mentioned in the foregoing description, the image 2123 corresponds to an image already downloaded by the first input signal.

Hence, as shown in FIG. 21(*c*), the mobile terminal can display an indicator 2150 indicating that the image is already downloaded. In this instance, the mobile terminal can stop downloading the image 2123 or can download the image 2123 again based on a selection of a user. Further, the mobile terminal can sense a third input signal 2134 input on the indicator 2150. In this instance, the third input signal 2134 corresponds to a touch input, a gesture input or the like input on a region corresponding to 'No' of the indicator 2150. Hence, the mobile terminal does not download the image 2123 again and can return to the message interface 2110 depicted in FIG. 21(*b*).

In addition, when the mobile terminal receives a message in which images are included, FIG. 22 shows a method of outputting the message in a message interface by deleting stored images among the images. A message change condition explained in the embodiment of FIG. 22 corresponds to when the images included in the message are stored.

As shown in FIG. 22 (*a*), the mobile terminal receives a message in which a plurality of messages 2221/2222/2223 are included and can output the message in a message interface 2210. In addition, the mobile terminal can sense input signals 2231/2232 input on the image 2221 and the image 2223 among a plurality of the images. In this instance, the mobile terminal can store an image corresponding to the image 2221 and an image corresponding to the image 2223. Further, as shown in FIG. 22 (*b*), the mobile terminal can delete the image 2221 and the image 2223 from the message interface 2210. Hence, the mobile terminal can output the image 2222, which is not stored, only.

Figure 23:
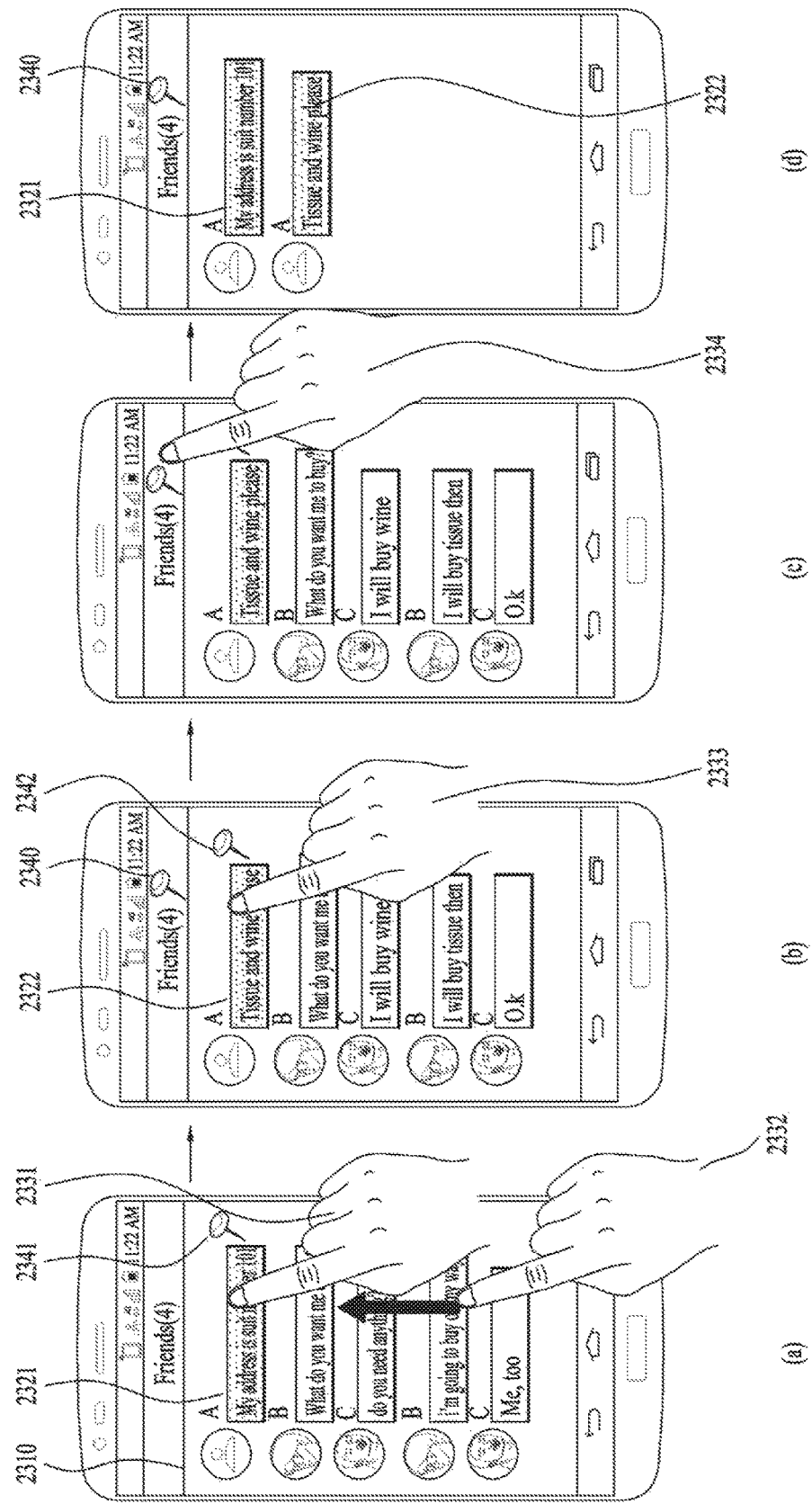
FIG. 23 is a diagram illustrating an example of outputting a received message to a message interface of the mobile terminal according to an embodiment of the present invention.
Figure 24:
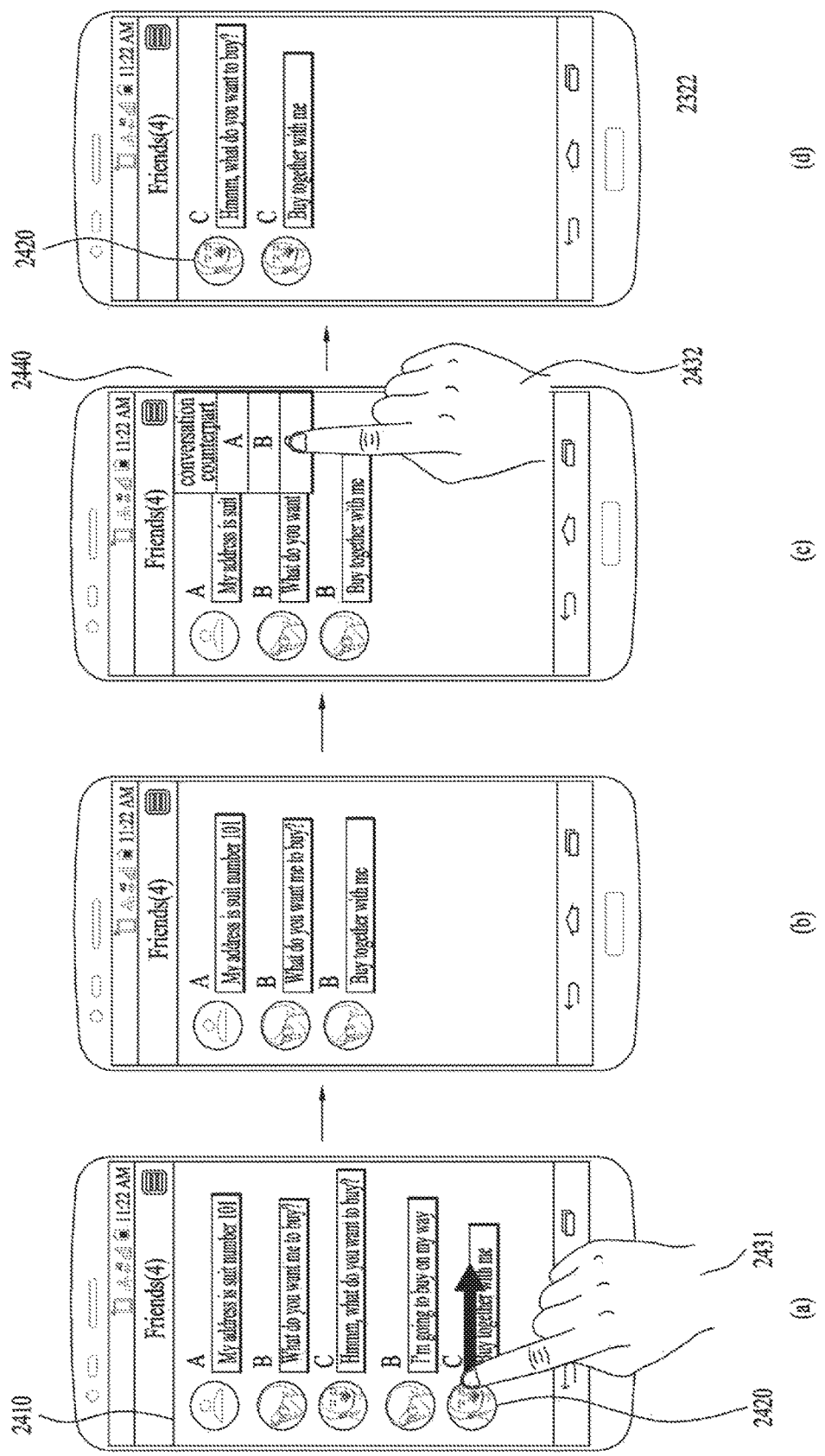
FIG. 24 is a diagram illustrating an example of outputting a received message to a message interface of the mobile terminal according to an embodiment of the present invention.

FIGS. 23 and 24 illustrate a method of outputting messages preferred by a user of the mobile terminal only in a message history in which a plurality of users transceive messages with each other by editing the messages. Since messages are quickly output and many messages are output in the message history in which a plurality of the users transceive messages with each other, the messages preferred by the user may not be recognized. Hence, it is preferable to have a method of editing the messages preferred by the user only among a plurality of messages.

In particular, FIG. 23 is a diagram illustrating an example of outputting a received message to a message interface of the mobile terminal according to an embodiment of the present invention. More specifically, FIG. 23 shows a method of editing a message in a message history in which a plurality of users transceive messages with each other. A message change condition explained in an embodiment of FIG. 23 corresponds to when an input signal input on a message is sensed.

As shown in FIG. 23 (a), the mobile terminal can output a message history of which messages are transceived with each other between a plurality of users in a message interface 2310. In an embodiment of FIG. 23 (a), a plurality of the users corresponds to a total of 4 persons including a user of the mobile terminal.

Referring to FIG. 23 (a), the mobile terminal can sense a first input signal 2331. In this instance, the first input signal 2331 can include a touch input, a gesture input and the like input on a message 2321 received from a device of an A user in the message history. In this instance, the mobile terminal can display a pin indicator 2341 on the message 2321. In this instance, the pin indicator 2341 corresponds to an indicator indicating a message selected by a user as an important message.

In addition, a user may want to search for an important message among a plurality of different messages except the message 2321. Hence, as shown in FIG. 23 (a), the mobile terminal can sense a second input signal 2332. The second input signal 2332 corresponds to a signal for searching for a recent message in the message history and corresponds to a drag touch or a flicking touch input for scrolling in up direction.

As shown in FIG. 23 (b), the mobile terminal can display recent messages instead of the message history displayed in FIG. 23 (a). The mobile terminal can sense a third input signal 2333. In this instance, the third input signal can include a touch input, a gesture input and the like input on a message 2322 received from a device of an A user in the message history. In this instance, the mobile terminal can display a pin indicator 2342 on the message.

Referring to FIGS. 23 (b) and (c), if the pin indicator 2341/2342 is displayed by an input signal of a user, the mobile terminal can output a pin icon 2340 on a region indicating a name of a message history. In this instance, the pin icon 2340 can indicate that there is a message on which a pin indicator is displayed in the message history.

Further, as shown in FIG. 23 (c), the mobile terminal can sense a fourth input signal 2334 input on the pin icon 2340. In this instance, the fourth input signal 2334 can include a touch input, a gesture input and the like. As shown in FIG. 23 (d), the mobile terminal can display messages 2321/2322 on which the pin indicator 2342 is displayed only in the message interface 2310. Further, a user can easily see messages preferred by the user only in the message history in which a plurality of users transceive messages with each other by editing the messages preferred by the user.

Next, FIG. 24 is a diagram illustrating an example of outputting a received message to a message interface of the mobile terminal according to an embodiment of the present invention. More specifically, FIG. 24 shows a method of editing a message in a message history in which a plurality of users transceive messages with each other. A message change condition explained in an embodiment of FIG. 24 corresponds to when an input signal input on a message is sensed.

As shown in FIG. 24 (a), the mobile terminal can output a message history of which messages are transceived with each other between a plurality of users in a message interface 2410. In an embodiment of FIG. 24 (a), a plurality of the users corresponds to a total of four persons including a user of the mobile terminal.

Referring to FIG. 24 (a), the mobile terminal can sense a first input signal 2331. In this instance, the first input signal 2431 corresponds to a drag touch or a flicking touch touching a region corresponding to an image 2420 of a C user in the message history. Further, the first input signal 2431 corresponds to a drag touch or a flicking touch moving from the image 2420 of the C user to the right side.

As shown in FIG. 24 (b), the mobile terminal can delete the message received from the device of the C user from the message interface 2410. In this instance, a user may want to check messages received from the C user. As shown in FIG. 24 (c), the mobile terminal can sense a second input signal 2432 input on a menu option 2440 indicating conversation partners. In this instance, the second input signal 2432 corresponds to a touch input or a gesture input on a region corresponding to the C user of the menu option 2440.

Further, as shown in FIG. 24 (d), the mobile terminal can output messages received from the C user 2420 in the message interface 2410 in response to the second input signal 2432. In addition, a user can separately check messages received from a specific user only in the middle of transceiving messages with a plurality of users. In the embodiment of FIG. 24 (c), if a drag touch or a flicking touch input moving to the left is sensed, the mobile terminal can output the message interface 2410 shown in FIG. 24 (a) again.

Figure 25:
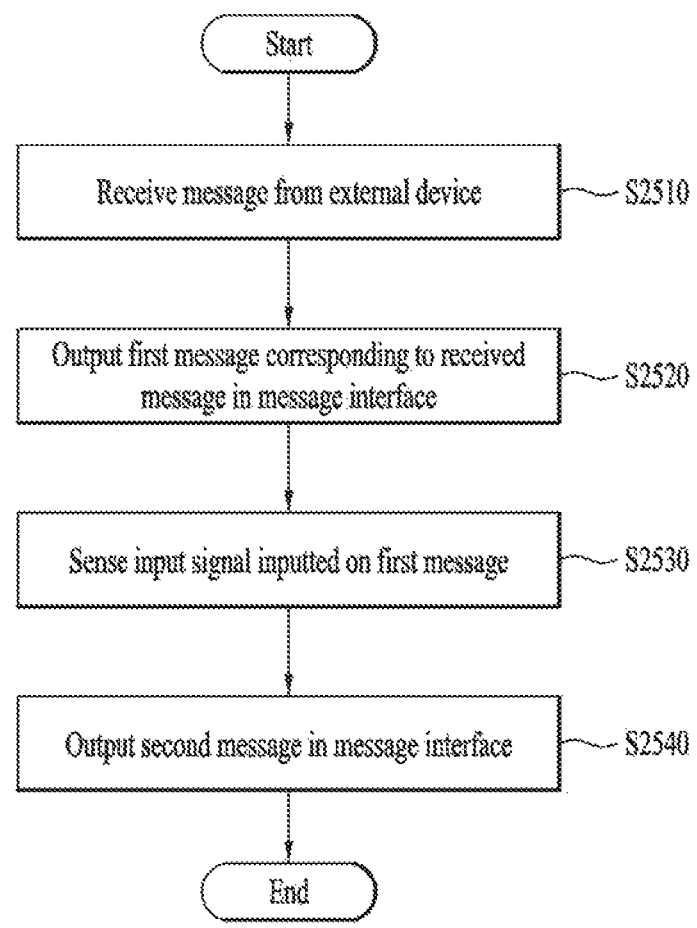
FIG. 25 is a flowchart illustrating a method of controlling a mobile terminal according to one embodiment of the present invention.

FIG. 25 is a flowchart illustrating a method of controlling a mobile terminal according to one embodiment of the present invention. The mobile terminal can receive a message from an external device (S2510). In addition, the mobile terminal can output a first message corresponding to the received message in a message interface (S2520), and sense an input signal input on the first message (S2530). For example, the input signal input on the first message corresponds to an input signal input on a part of a plurality of information included in the first message. This will be explained again with reference to FIG. 26.

In addition, the mobile terminal can output a second message in the message interface (S2540). The second message corresponds to a message that at least a part of the first message is changed. For example, the second message corresponds to a message that at least a part of the first message is deleted. Further, the mobile terminal can output an indicator indicating that there exists other information rather than the output second message. If time information is included in a received message, the mobile terminal can display an indicator indicating the time information in the message interface. This will be described again with reference to FIG. 28.

In embodiments of FIGS. 26 to 37, when an input signal input on a message displayed in a message interface is sensed, a method of outputting the message by changing the message is explained. A message change condition explained in the embodiments of FIG. 26 to FIG. 37 corresponds to sensing an input signal input on a message.

Figure 26:
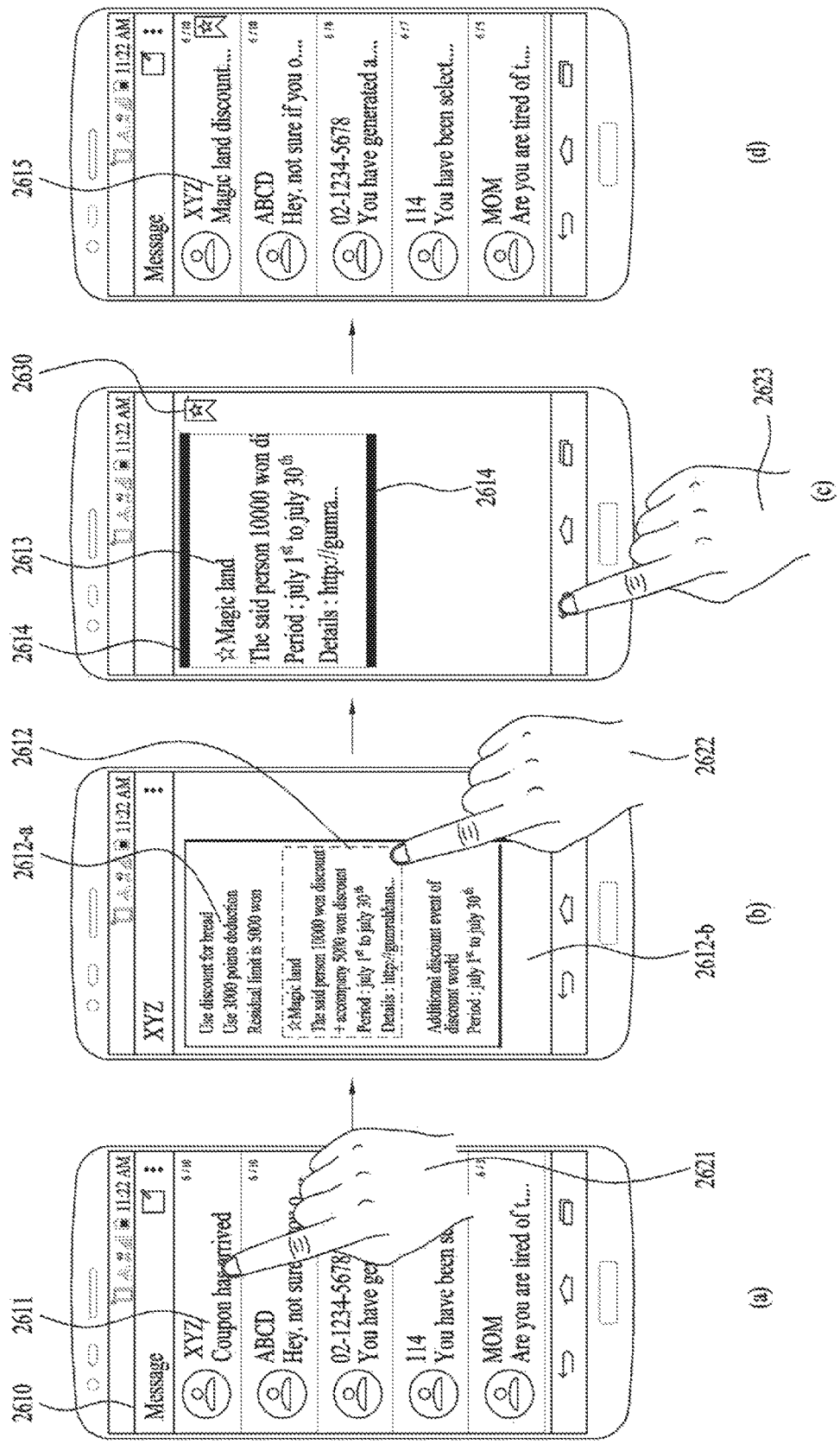
FIG. 26 is a diagram illustrating an example of outputting a received message to a message interface of the mobile terminal according to an embodiment of the present invention.

In particular, FIG. 26 is a diagram illustrating an example of outputting a received message to a message interface of the mobile terminal according to an embodiment of the present invention. More specifically, when a plurality of information are included in a received message, FIG. 26 shows a method of editing the message.

As shown in FIG. 26 (a), the mobile terminal can output a message list 2610. As mentioned earlier in FIG. 5, the message list 2610 includes a plurality of message histories including messages transceived with a plurality of other users. For example, the message list 2610 can output names of users who have transceived the messages and recently transceived messages.

The mobile terminal can sense a first input signal 2621 input on the message list 2610. More specifically, the mobile terminal can sense the first input signal 2621 input on a message history among the message list 2610. The first input signal 2621 can include a touch input, a gesture input and the like input on a region corresponding to the message history 2611 of which a message is transceived with an XYZ user among the message histories.

In this instance, the mobile terminal can display the message history of which a message is transceived with the XYZ user in a full screen. Further, as shown in FIG. 26 (b), the mobile terminal can output a recently transceived message in the message interface 2610. In FIG. 26 (b), a message recently received from a device of the XYZ user corresponds to a message in which a plurality of information is included. In particular, the received message can include first information 2612-a, second information 2612 and third information 2612-b. In this instance, a plurality of the information can include various information including event information, coupon information and the like.

In addition, as shown in FIG. 26 (b), the mobile terminal can sense a second input signal 2622 input on a message output on a message history. The second input signal 2622 can include a touch input, a gesture input and the like input on a region corresponding to the second information 2612 of the received message. For example, the second input signal 2622 corresponds to a long touch input, a short touch input or the like. In addition, the region corresponding to the second information 2612 can include a region adjacent to a region to which a text related to the second information 2612 is output. In particular, the region corresponding to the second information 2612 corresponds to a region represented by a dotted line.

As shown in FIG. 26 (c), the mobile terminal can output an edited message 2613 in the message history. The edited message 2613 corresponds to information of high priority configured by a user. The mobile terminal can display an indicator 2614 indicating existence of the first information 2612-a and the third information 2612-b at the front and the rear of the second information 2612. A method of displaying the edited message is explained with reference to FIG. 27 in the following.

Figure 27:
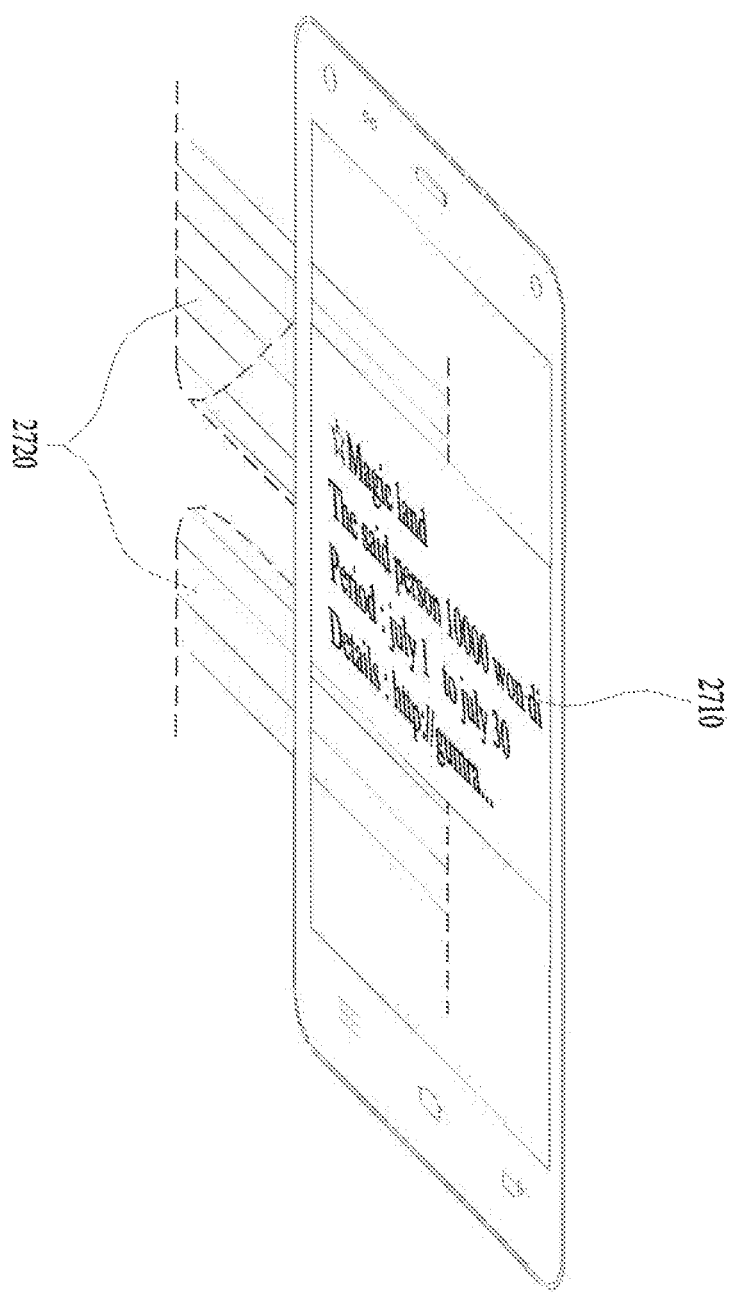
FIG. 27 is a diagram illustrating an example of outputting an edited message in a mobile terminal related to the present invention.

Next, FIG. 27 is a diagram illustrating an example of outputting an edited message in a mobile terminal related to the present invention. Referring to FIG. 27, the mobile terminal outputs an edited message 2710 among all messages on the display unit and a region except the edited message can be configured as a folded region 2720. Further, the folded region 2720 is not a part deleted from the all messages but a region hided by editing of a user.

Referring back to FIG. 26, the mobile terminal can display an edit indicator 2630 to indicate that the message corresponds to the edited message 2613. If an input signal input on the edit indicator 2630 is sensed, the mobile terminal can display the message shown in FIG. 26 (b) again.

In addition, as shown in FIG. 26 (c), the mobile terminal can sense a third input signal 2623 input on a back button. The third input signal 2623 can include a touch input, a gesture input and the like input on the back button mounted on the mobile terminal. The back button can include both a soft key and a hardware key.

As shown in FIG. 26 (d), the mobile terminal can output the message list 2610 again. In this instance, unlike the message list shown in FIG. 26 (a), it may differently output message content of the message history for the A user. In particular, if the message content is edited by a user in the message history, the mobile terminal can display an edited message 2615 in the message list. By doing so, a user can easily check a preferred menu in an upper menu. Further, the mobile terminal can display a return icon to indicate that a message corresponds to a message edited in the message list 2610.

Figure 28:
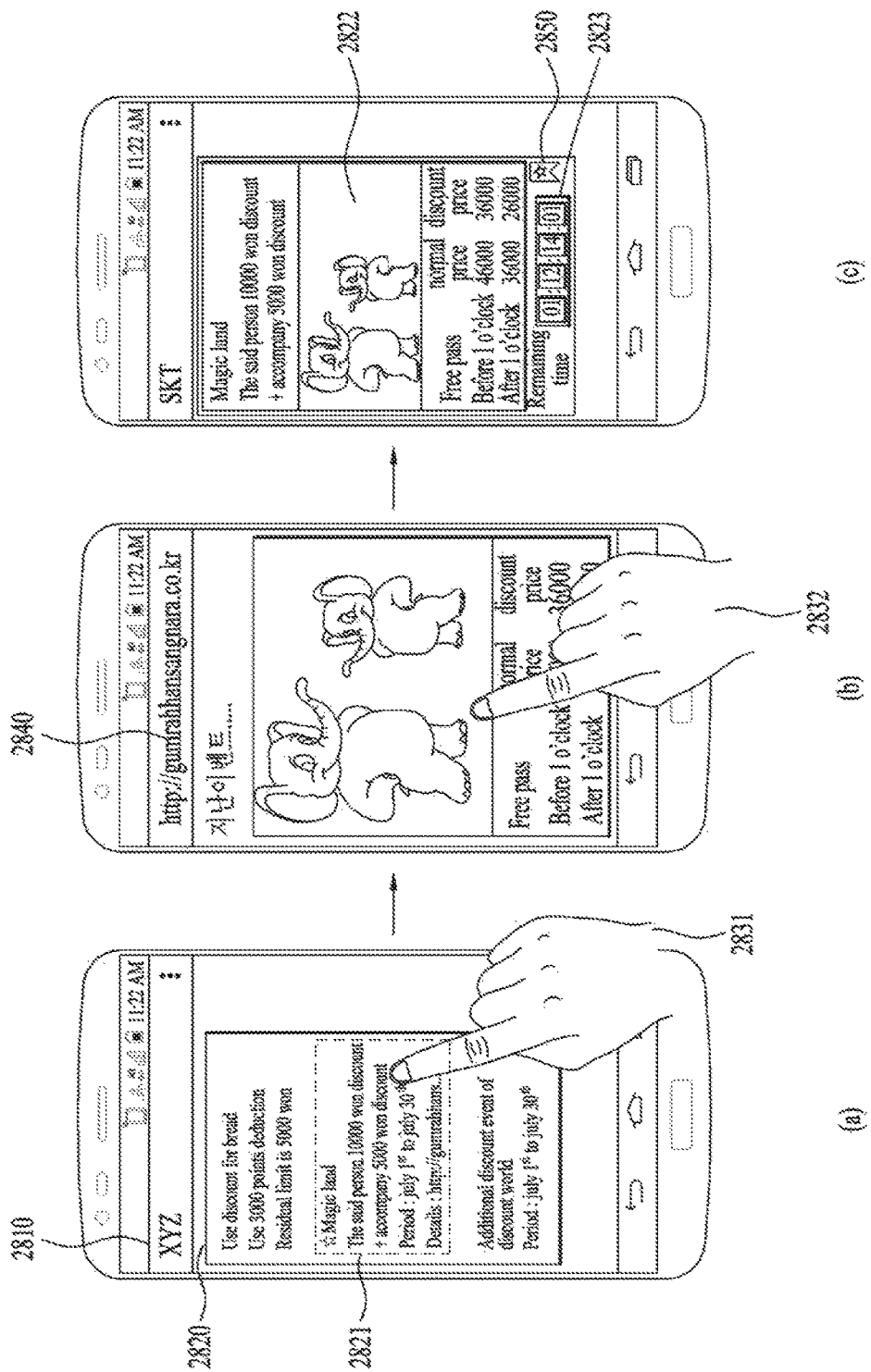
FIG. 28 is a diagram illustrating an example of outputting a received message to a message interface of the mobile terminal according to an embodiment of the present invention.

FIG. 28 is a diagram illustrating an example of outputting a received message to a message interface of the mobile terminal according to an embodiment of the present invention. More specifically, when a plurality of information are included in a received message, FIG. 28 shows a method of editing the message.

The mobile terminal can output a message transceived with a device of a different user in a message history 2810. Referring to FIG. 28 (a), the mobile terminal can output a message 2820 including a plurality of information. In this instance, the plurality of the information includes event information, coupon information, discount information and the like.

In addition, the mobile terminal can sense a first input signal 2831 input on the message 2820 including a plurality of the information. The first input signal 2831 can include a touch input, a gesture input and the like input on a region corresponding to first information 2821 among the message 2820 including a plurality of the information. For example, the region corresponding to the first information 2821 can include a region adjacent to a region to which a text related to the first information 2821 is output. In particular, in FIG. 28 (a), the region corresponding to the first information 2821 corresponds to a region represented by a dotted line.

As shown in FIG. 28 (b), the mobile terminal can display a web page 2840 corresponding to a web link shown in the first information 2821. In relation to this, the mobile terminal executes a web page interface by multitasking in the middle of executing a message interface 2810 and can then display the web page. In this instance, a user can store or share information shown in the web page to easily use the information at any time without accessing the web page.

Hence, the mobile terminal can sense a second input signal 2832 input on the web page 2840. The second input signal 2832 corresponds to an input signal for capturing or storing an image included in the web page 2840. For example, as shown in FIG. 28 (b), the second input signal 2832 can include such an input on a touch screen as a touch input and a gesture input. Further, for example, the second input signal 2832 can include an input on a soft key or a hardware key mounted on the mobile terminal.

The mobile terminal can capture or store the image included in the web page 2840. Further, as shown in FIG. 28 (c), the mobile terminal terminates the web page interface, returns to the message interface 2810 and can output the captured or stored image 2822 instead of the message 2821 including a plurality of the information. In particular, the mobile terminal can output an image indicating information preferred by a user instead of the message 2821 including a plurality of the information, which is difficult for the user to recognize the information preferred by the user.

Further, the mobile terminal senses time information included in at least one of the first information 2821 and the web page 2840 and can output the time information 2823 instead of the message 2821 including a plurality of the information. For example, the time information 2823 corresponds to a validity period, an event occurrence date, a validity count and the like. In particular, as shown in FIG. 28 (*c*), the mobile terminal recognizes a validity period of the first information 2821 and can output information on the validity period in the message interface 2810.

Hence, as shown in FIG. 28 (*c*), the mobile terminal can output at least one of the image 2822 indicating the first information and the time information 2823 of the first information instead of the message 2820 including a plurality of the information. As shown in FIG. 28 (*c*), when at least one of the image 2822 indicating the first information and the time information 2823 of the first information is output, the mobile terminal can display an edit indicator 2850 indicating an edited message. Further, if an input signal input on the edit indicator 2850 is sensed, the mobile terminal can output the message 2821 including a plurality of the information again.

If at least one of the image 2822 indicating the first information and the time information 2823 of the first information is displayed in the message history, the mobile terminal can sense an input signal for entering the message list, which is an upper menu. The mobile terminal can display important content of the first information and the time information in the message list.

Figure 29:
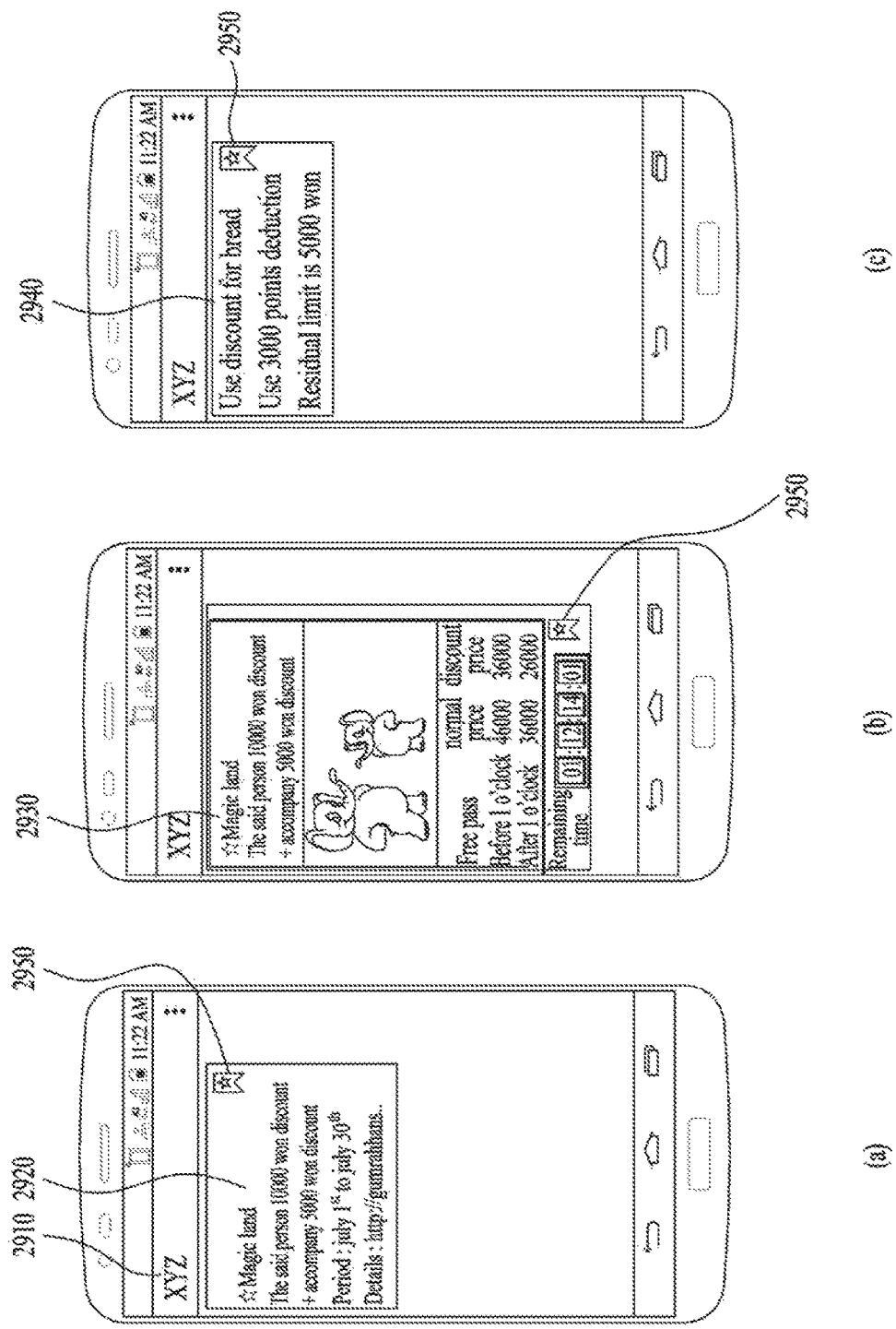
FIG. 29 is a diagram illustrating an example of outputting a received message to a message interface of the mobile terminal according to an embodiment of the present invention by modifying the message.

FIG. 29 is a diagram illustrating an example of outputting a received message to a message interface of the mobile terminal according to an embodiment of the present invention by modifying the message. More specifically, when a message is edited by sensing an input signal by a user, FIG. 29 shows various types of the message displayed in a message history. An embodiment of FIG. 29 is explained based on the message including a plurality of information shown in FIG. 26 (*b*) or FIG. 28 (*a*).

Referring to FIG. 29 (*a*), the mobile terminal can output a first edit message 2920 in a message interface 2910 by cropping an area preferred by a user only from a message including a plurality of information. In relation to this, as mentioned earlier in FIG. 26, the mobile terminal can output an indicator indicating the existence of non-output remaining information at the top or the bottom of the first edit message 2920. Further, the mobile terminal can display an edit indicator 2950 capable of making the first edit message return to an original message. For example, the edit indicator 2950 can be displayed at the inside of a second edit message 2920 or a position adjacent to the second edit message.

Referring to FIG. 29 (*b*), the mobile terminal can output a second edit message 2930 in the message interface 2910 by editing at least one of an image corresponding to information preferred by a user and schedule information corresponding to the information preferred by the user in a message including a plurality of information. In relation to this, as mentioned earlier in FIG. 28, the mobile terminal stores or captures a web page corresponding to a web link included in the message including a plurality of information and can output the web page as the second edit message 2930. Further, the mobile terminal can display an edit indicator 2950 capable of making the second edit message return to an original message. For example, the edit indicator 2950 can be displayed at the inside of the second edit message 2930 or a position adjacent to the second edit message.

Meanwhile, after the first edit message 2920 depicted in FIG. 29 (*a*) and the second edit message 2930 depicted in FIG. 29 (*b*) are output, if a validity period of a corresponding event expires, the mobile terminal can output a third edit message 2940. The third edit message 2940 corresponds to a message for outputting remaining information except information of which the validity period is expired in the message including a plurality of the information, which is the original message. For example, the remaining information corresponds to information of which there is no validity period or information of which the validity period is not expired. Further, the mobile terminal can display an edit indicator 2950 capable of making the third edit message return to an original message. For example, the edit indicator 2950 can be displayed at the inside of the third edit message 2940 or a position adjacent to the third edit message.

Figure 30:
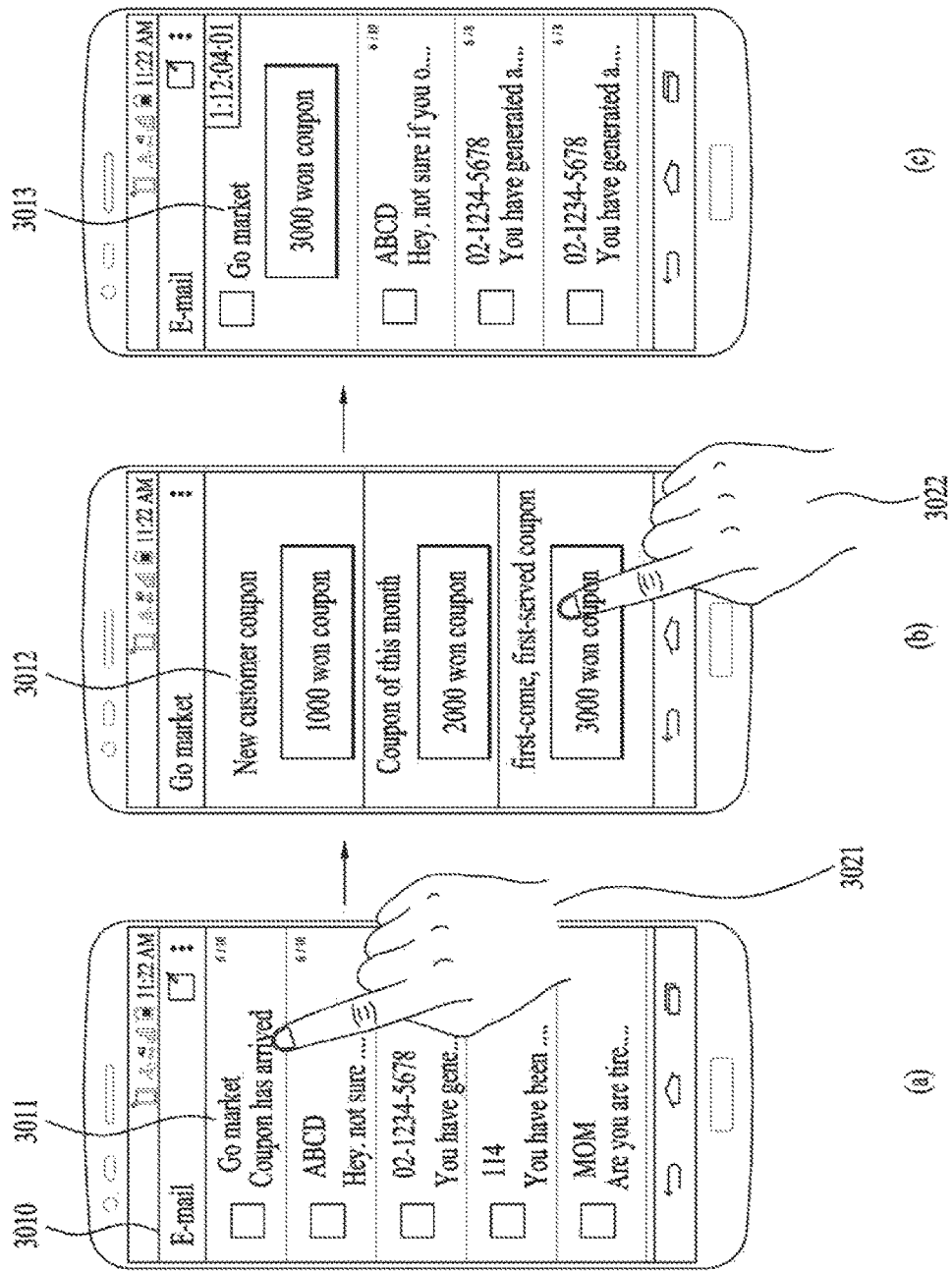
FIG. 30 is a diagram illustrating an example of outputting e-mail received in a mobile terminal related to the present invention to an e-mail interface.

FIG. 30 is a diagram illustrating an example of outputting e-mail received in a mobile terminal related to the present invention to an e-mail interface. More specifically, when a received message correspond to e-mail, FIG. 30 shows a method of editing the e-mail in e-mail list. Further, in an embodiment of FIG. 30, assume that an edited e-mail corresponds to an e-mail including coupon information.

As shown in FIG. 30 (*a*), the mobile terminal can output a list of e-mails 3010 in an e-mail interface. The e-mail interface corresponds to a charged or a free e-mail application. Further, the e-mail list 3010 corresponds to a list for displaying a plurality of e-mails received from other users at a time. For example, the e-mail list 3010 can output a name of a different user who has transmitted an e-mail and a title of an e-mail.

The mobile terminal can sense a first input signal 3021 input on the e-mail list 3010. More specifically, the mobile terminal can sense the first input signal input on first e-mail information 3011 among the e-mail list 3010. The first input signal 3021 can include a touch input, a gesture input and the like input on a region corresponding to the first e-mail information 3011, which is an e-mail received from 'GO market', among an e-mail history.

As shown in FIG. 30 (*b*), the mobile terminal can display a first e-mail 3012 according to the sensed first input signal 3021. The first e-mail 3012 corresponds details of the first e-mail information 3011 included in the e-mail list. The first e-mail 3012 can include a plurality of information. For example, a plurality of the information can include information in which a validity period is included.

Further, the mobile terminal can sense a second input signal 3022 input on the first e-mail 3012. The second input signal 3022 corresponds to an input signal for capturing or storing the information in which the validity period is included, which is included in the first e-mail 3012. Further, the second input signal 3022 corresponds to an input signal for editing the information in which the validity period is included, which is included in the first e-mail 3012, and displaying the information on the e-mail list.

In particular, as shown in FIG. 30 (*c*), if the second input signal 3022 is sensed, the mobile terminal recognizes the information in which the validity period is included, which is included in the first e-mail 3012, and can display edit e-mail information 3013. For example, the edit e-mail information 3013 can include information content and a validity period. In this instance, since the validity period is provided in a timer form, a user can intuitively recognize a remaining validity period of a coupon. In particular, although a user does not enter details via a separate input signal in the e-mail list, the user can immediately recognize important information in the e-mail list.

If a validity period is expired, the mobile terminal can output the first e-mail information 3010 corresponding to original information instead of the edit e-mail information 3013 displayed in the e-mail list 3010. In particular, if the validity period is expired, the mobile terminal can display the e-mail list 3010 shown in FIG. 30 (*a*) again.

Figure 31:
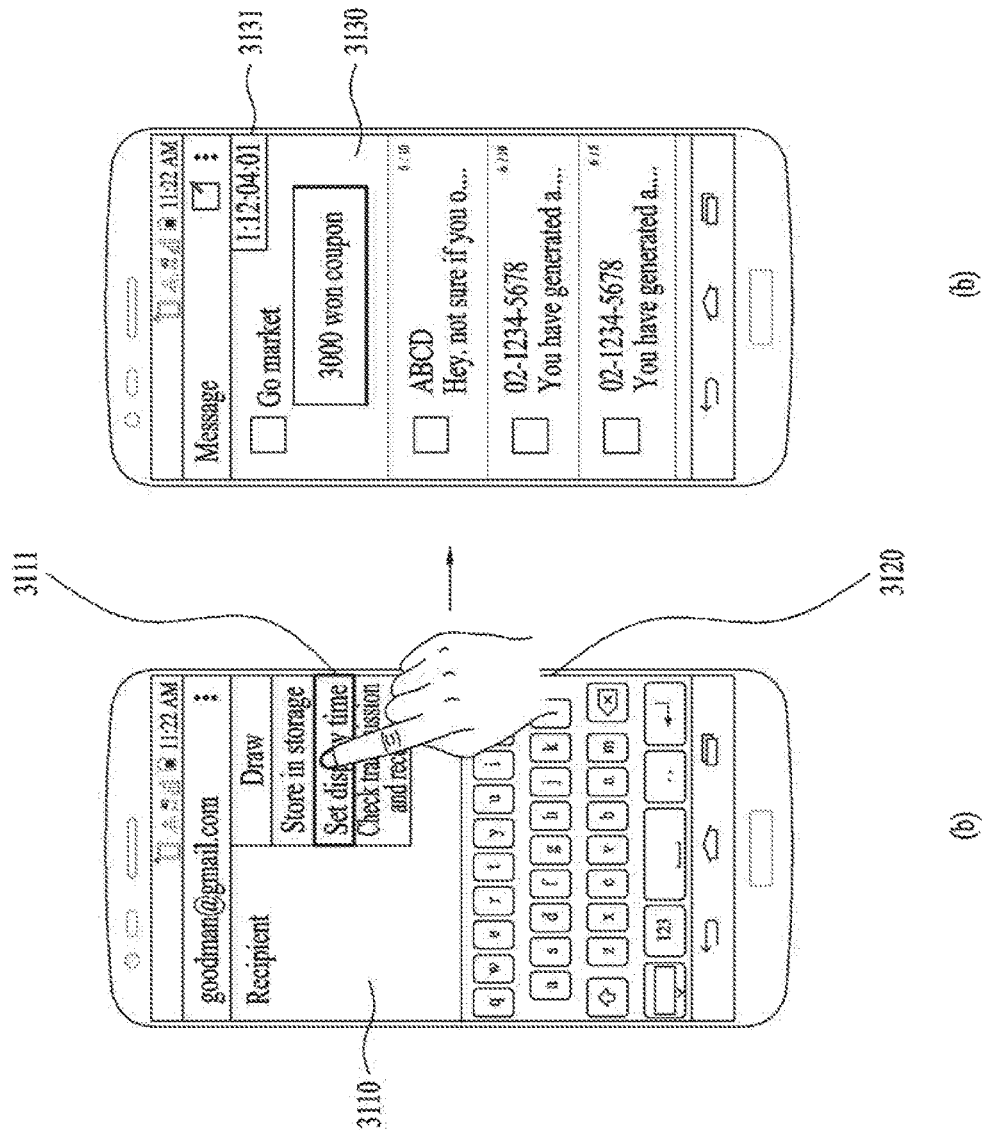
FIG. 31 is a diagram illustrating an example of a transmission device and a reception device in relation to an embodiment of FIG. 30.

FIG. 31 is a diagram illustrating an example of a transmission device and a reception device in relation to an embodiment of FIG. 30. More specifically, FIG. 31 shows an embodiment that a transmission device transmitting an e-mail including the information of FIG. 30 in which the validity period is included and a reception device receiving the e-mail output an e-mail. In the embodiment of FIG. 31, assume that a mobile terminal depicted in FIG. 31(*a*) corresponds to a transmission device and a mobile terminal depicted in FIG. 31 (*b*) corresponds to a reception device.

Referring to FIG. 31(*a*), a transmission device can generate an e-mail to be transmitted to a reception device. In particular, the transmission device can generate an e-mail in an e-mail interface 3110 according to an input signal 3120 sensed by a user. In one embodiment, the transmission device can sense an input signal 3120 input on a menu option for writing content of the e-mail interface 3110. The mobile terminal can write the content of the e-mail. In another embodiment, the transmission device can sense an input signal 3120 input on a menu option 3111 for setting display time of the e-mail interface 3110. The mobile terminal can configure a validity period of the e-mail to be displayed in the reception device.

Further, referring to FIG. 31(*b*), the reception device can output the e-mail received from the transmission device. The reception device can output information of the received e-mail on the e-mail list based on the validity period configured by the transmission device in FIG. 31 (*a*). For example, the information of the received e-mail corresponds to a title of the received e-mail and a name of a sender. Yet, as mentioned earlier in FIG. 30, if an input signal of a user input on the received e-mail is sensed, as shown in FIG. 31 (*b*), the mobile terminal can output information 3130 included in the e-mail and a validity period 3131 of the information. The validity period 3131 of the information can include the validity period configured by the transmission device or the validity period set to the information, which is included in the e-mail.

Figure 32:
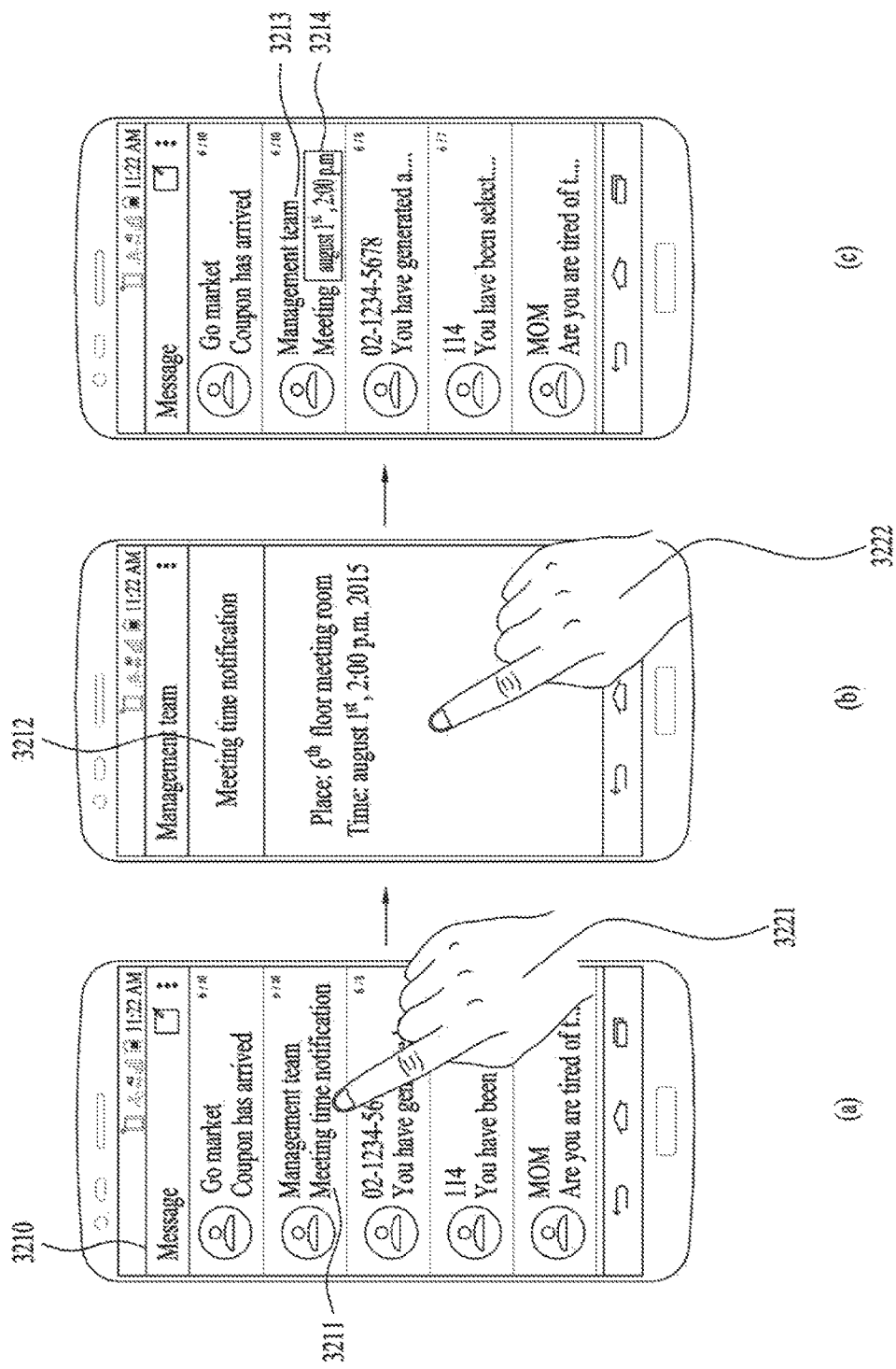
FIG. 32 is a diagram illustrating an example of outputting e-mail received in a mobile terminal related to the present invention to an e-mail interface by editing the received e-mail.
Figure 33:
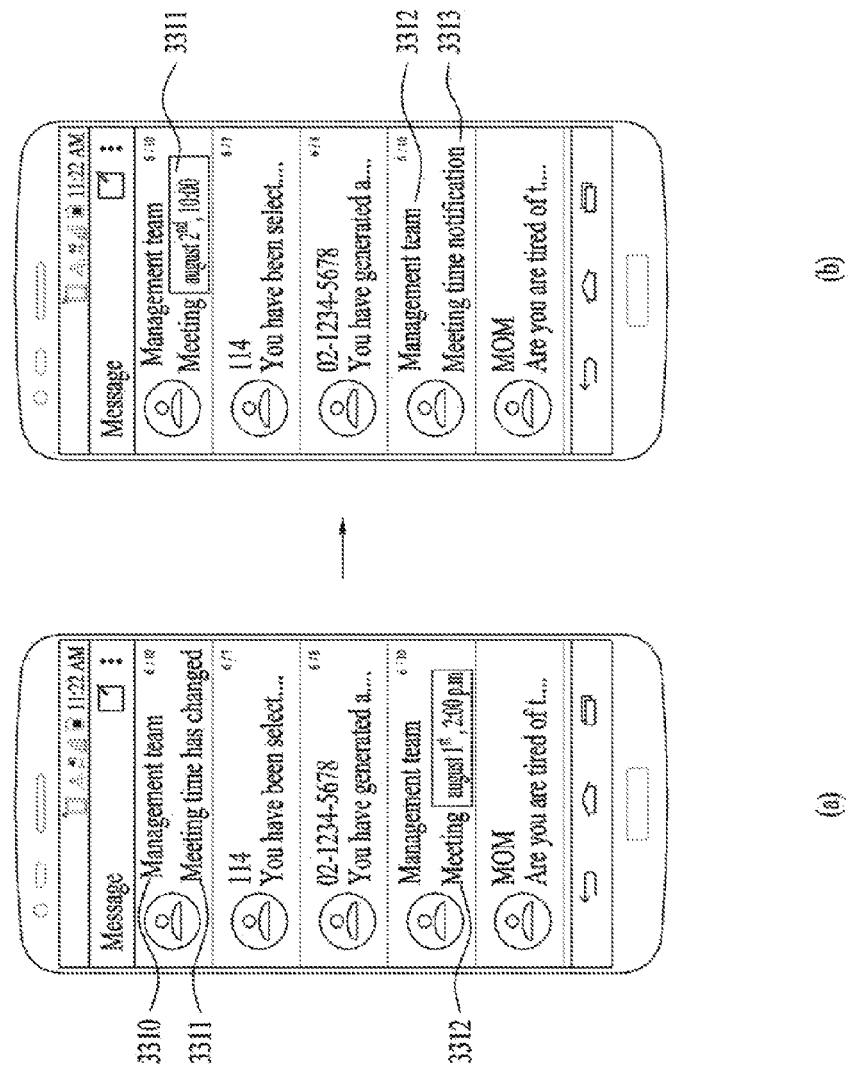
FIG. 33 is a diagram illustrating an example of outputting e-mail received in a mobile terminal related to the present invention to an e-mail interface by editing the received e-mail.

FIGS. 32 and 33 are diagrams illustrating an example of outputting an e-mail received in a mobile terminal related to the present invention to an e-mail interface by editing the e-mail. Further, in embodiments of FIGS. 32 and 33, assume that the edited e-mail corresponds to an e-mail including schedule-related information.

When a received message corresponds to an e-mail, FIG. 32 shows a method of editing information of the e-mail output in an e-mail list.

The mobile terminal can output an e-mail list 3210 in an e-mail interface. Further, the mobile terminal can sense a first input signal 3221 input on first e-mail information 3211 among the e-mail list 3210. As shown in FIG. 32 (*b*), the mobile terminal can display a first e-mail 3212 in the e-mail interface according to the sensed first input signal 3221. The first e-mail corresponds to details of the first e-mail information 3211 output in the e-mail list 3210. The first e-mail 3212 can include time information. In the embodiment of FIG. 32, the time information corresponds to meeting time.

Further, the mobile terminal can recognize the time information included in the first e-mail 3212.

Further, the mobile terminal can sense a second input signal 3222 input on the first e-mail 3212. For example, the second input signal 3222 can include a touch input or a gesture input on the first e-mail 3212. Further, for example, the second input signal 3222 can include an input on a soft key or a hardware key mounted on the mobile terminal. The second input signal 3222 corresponds to a signal for displaying the time information included in the first e-mail 3212 in the e-mail list 3210.

In particular, as shown in FIG. 32 (*c*), the mobile terminal can output edited first e-mail information 3213 in a region on which the first e-mail information 3211 is output in the e-mail list 3210. The edited first e-mail information 3213 can include time information 3214 recognized by the mobile terminal with the help of the second input signal 3222. For example, the time information 3214 corresponds to time related to a schedule. In particular, the time information shown in FIG. 32 corresponds to a time on which a schedule occurs. Hence, the time information, which is mentioned earlier in FIG. 30, indicating a validity period may be different from the time information described in FIG. 32.

In the embodiment of FIG. 22, when an e-mail including time information is additionally received from an identical sender, FIG. 33 shows a method of editing time information displayed in an e-mail list. As shown in FIG. 33 (*a*), when edited first e-mail information 3311 is displayed in the message list, the mobile terminal can receive a second e-mail from an identical sender. Hence, the mobile terminal can output the first e-mail information 3311 and second e-mail information 3312 in the message list at the same time. In this instance, depending on configuration, the preferentially received first e-mail information 3311 can be positioned at the below of the second e-mail information in the message list.

As shown in FIG. 33 (*b*), the mobile terminal recognizes the second e-mail received from the same sender and can output a position on which the time information is displayed and content of the time information by changing the position and the content. In one embodiment, when the second e-mail is received, although a separate input signal of a user is not sensed, the mobile terminal deletes the time information output to the first e-mail information 3311 and can output time information 3313 to the second e-mail information 3312. The output time information 3313 can be displayed based on the time information included in the content of the second e-mail.

In another embodiment, when the second e-mail is received, if an input signal of a user is sensed, the mobile terminal deletes the time information output to the first e-mail information 3311 and can output the time information 3313 to the second e-mail information 3312. As mentioned earlier in the embodiment of FIG. 32, if a first input signal input on the second e-mail information 3312 is sensed, the mobile terminal can output details of the second e-mail. In this instance, if a second input signal input on the second e-mail is sensed, the mobile terminal can output the time information 3313 to the second e-mail information 3312. The output time information 3313 can be determined based on the time information included in the second e-mail.

In particular, according to the aforementioned embodiments, if an e-mail of an identical sender or identical content is additionally received, the mobile terminal recognizes content included in the e-mail and can display time information in the e-mail list by changing the time information.

Figure 34:
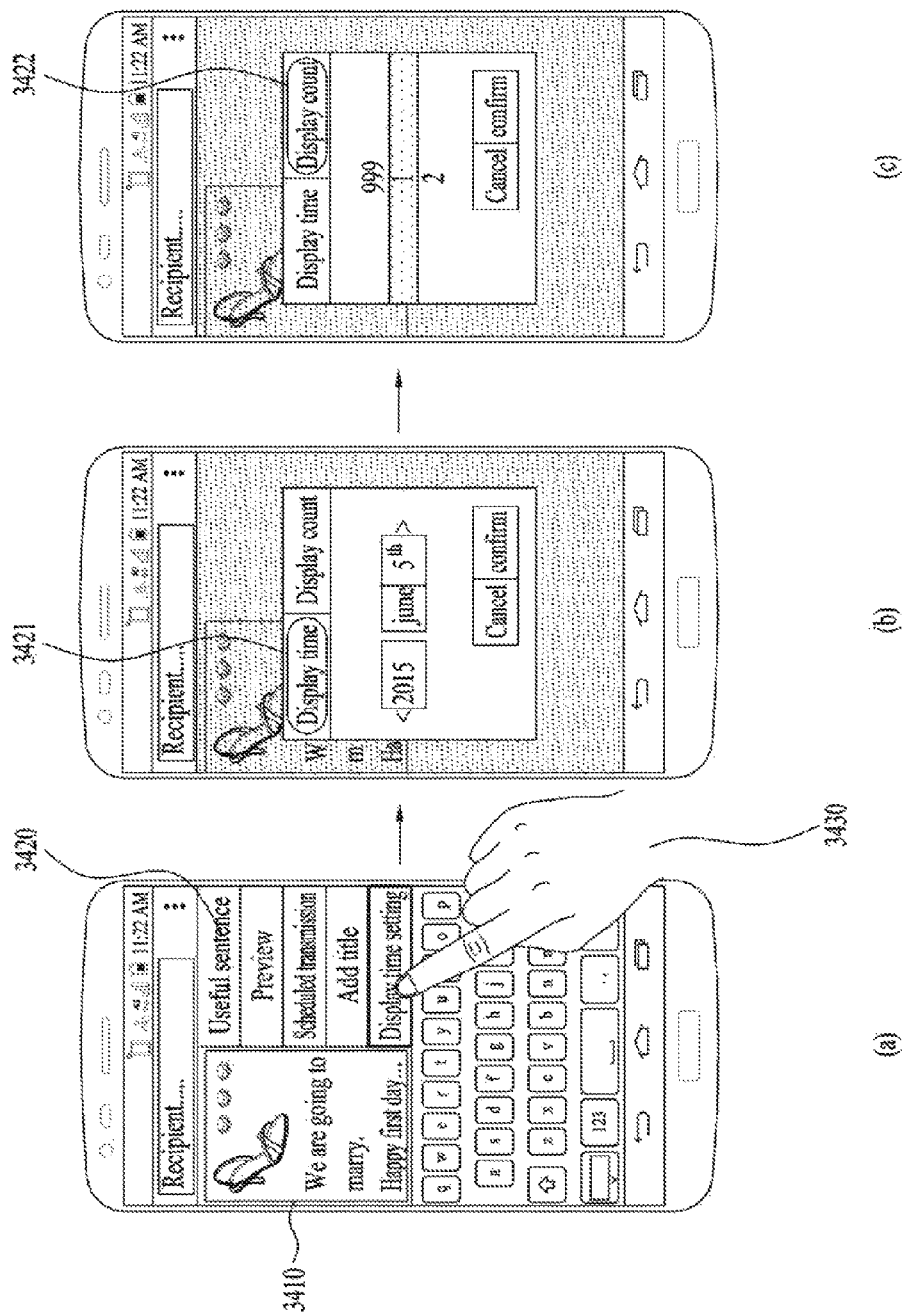
FIG. 34 is a diagram illustrating an example of a transmission device and a reception device providing a message interface related to the present invention.
Figure 35:
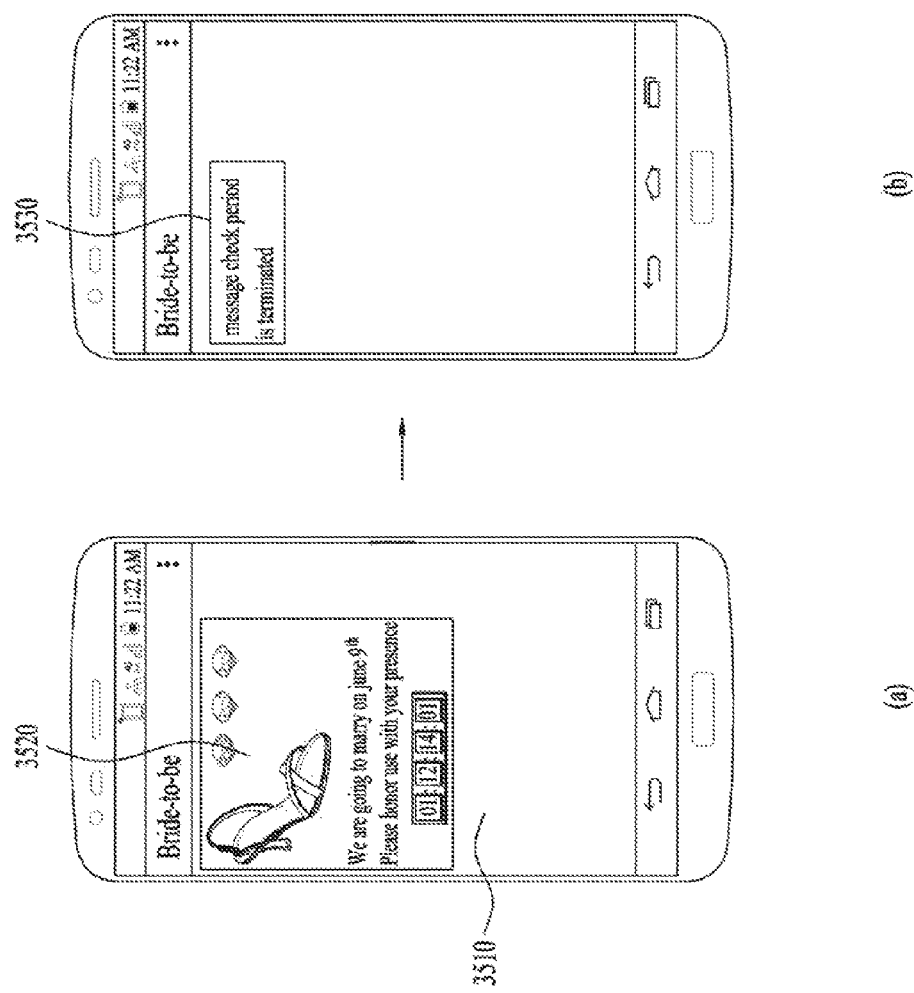
FIG. 35 is a diagram illustrating an example of a transmission device and a reception device providing a message interface related to the present invention.

FIGS. 34 and 35 are diagrams illustrating an example of a transmission device and a reception device providing a message interface related to the present invention. When a transmission device transmits a message according to a menu option for configuring time information, FIG. 34 shows an embodiment of configuring the time information. Assume that a mobile terminal of FIG. 34 corresponds to a transmission device.

As shown in FIG. 34 (*a*), the mobile terminal can generate a message to be transmitted to a reception device in a message interface 3410. In particular, the mobile terminal can generate a message according to an input signal of a user. In one embodiment, the mobile terminal can write contents included in a message according to an input signal of a user. For example, the input signal of the user corresponds to a touch input or a gesture input on a QWERTY keyboard provided in the message interface. In an embodiment of FIG. 34, the content included in the message corresponds to a marriage notification.

In another embodiment, the mobile terminal can configure a validity period of a message according to an input signal 3430 of a user input on a time configuration menu option 3420. This is because, as shown in the embodiment of FIG. 34, if content for a one-time event is included in a message, it is not necessary to permanently provide the message content to a reception device. Further, as shown in the embodiment of FIG. 34, this is because, although the content for the one-time event is not included in the message, a user of the transmission device wants to provide the message to the reception device for limited time only.

In addition, the mobile terminal can configure a display period or a display count of a sending message according to a sensed input signal 3430. Referring to FIG. 34 (*b*), the mobile terminal can configure a period of displaying a message in a reception device via a display time menu option 3421 corresponding to a sub menu of the time configuration menu option 3420. The period of displaying the message in the reception device can be determined by an additional input signal of a user. Further, referring to FIG. 34 (*c*), the mobile terminal can configure a count of displaying a message in a reception device via a display count menu option 3422 corresponding to a sub menu of the time configuration menu option 3420. The count of displaying the message in the reception device can be determined by an additional input signal of a user.

In addition, FIG. 35 shows an embodiment of outputting a message in a reception device according to time information configured by a transmission device. Assume that a mobile terminal in FIG. 35 corresponds to a reception device. As shown in FIG. 35 (*a*), if a message is received from the transmission device of FIG. 34, the mobile terminal can output message content and time information 3520 in the message interface. In addition, as shown in FIG. 35 (*b*), if time configured to the time information 3520 elapses, the mobile terminal deletes the message content and can output a message 3530 indicating that the message display time elapsed instead of the message content.

In one embodiment, the time configured to the time information 3520 corresponds to information including time such as month, day, hour and minute. For example, the time information 3520 corresponds to Jan. $12^{th}$, 16:01. Hence, the mobile terminal can delete the message content after Jan. $12^{th}$, 16:01. In another embodiment, the time configured to the time information 3520 corresponds to a display count. For example, the time information 3520 corresponds to a case that a user checks a message twice. Hence, if the message received from the transmission device is displayed two times according to an input signal of the user, the mobile terminal can delete the message content.

Figure 36:
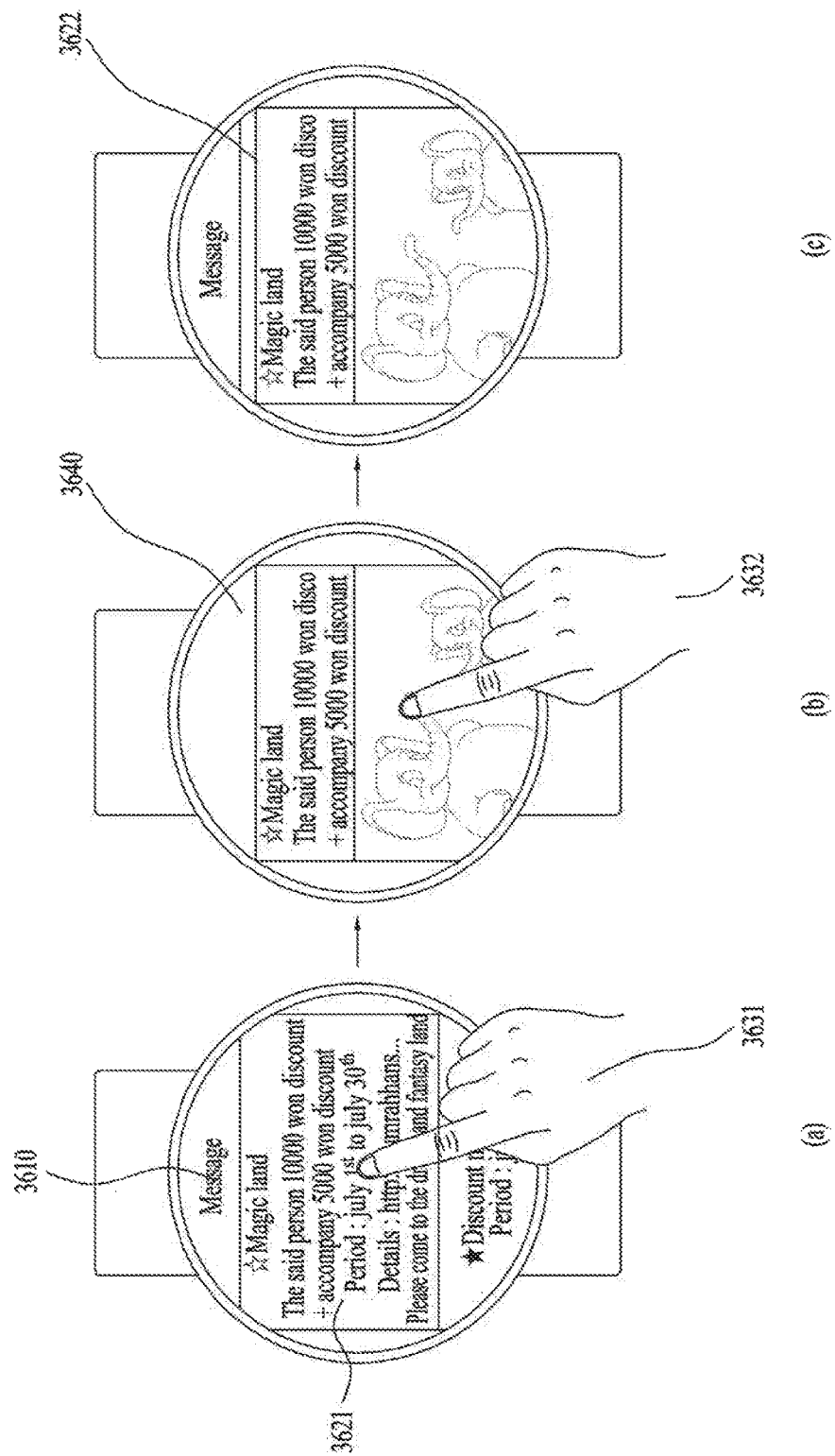
FIG. 36 is a diagram illustrating an example of outputting a message received in a watch-type mobile terminal related to the present invention to a message interface.
Figure 37:
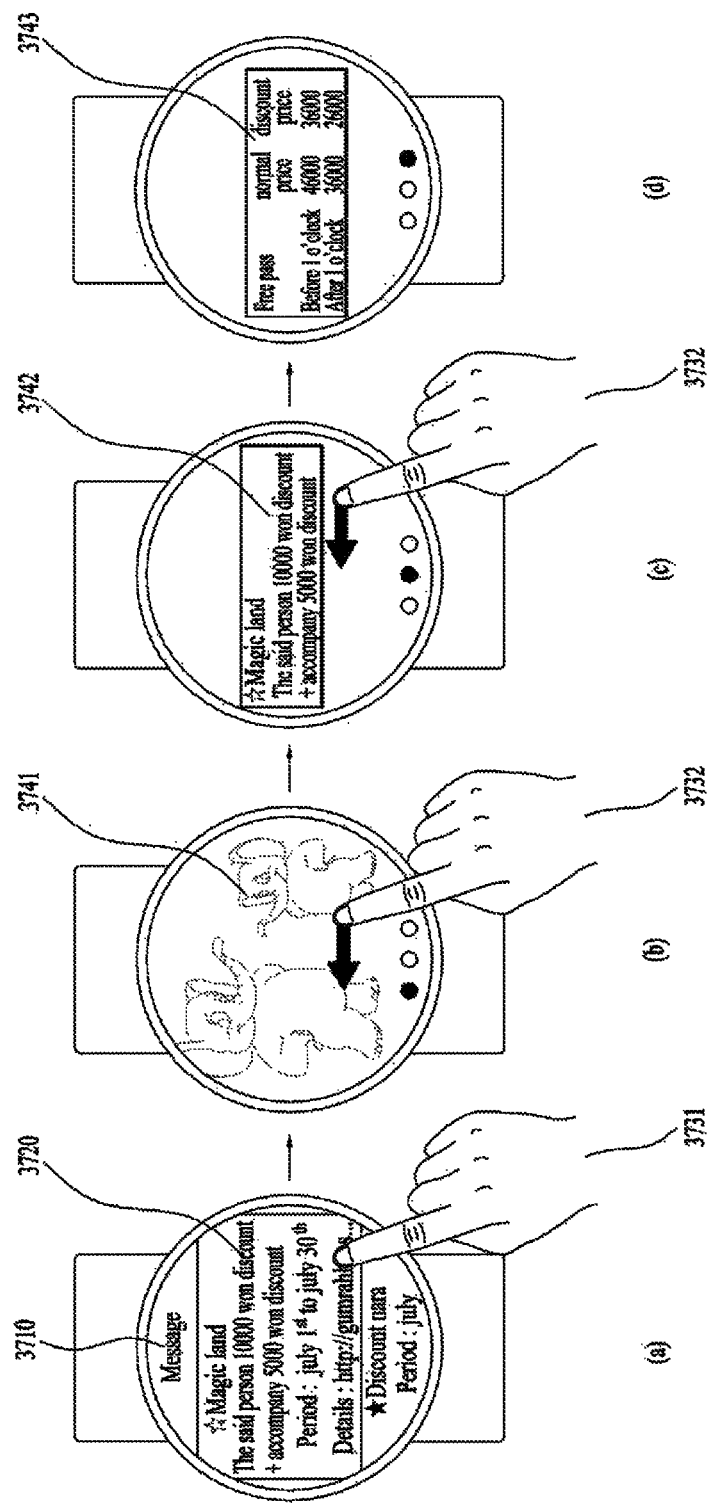
FIG. 37 is a diagram illustrating an example of outputting a message received in a watch-type mobile terminal related to the present invention to a message interface.

FIGS. 36 and 37 are diagrams illustrating an example of outputting a message received from a watch-type mobile terminal related to the present invention to a message interface. Assume when the watch-type mobile terminal (hereinafter, 'mobile terminal') of FIGS. 36 and 37 and an external device such as a smartphone are paired with each other. Further, a message received by the mobile terminal corresponds to a message received by the mobile terminal itself or a message received from an external device.

When a message received by the mobile terminal includes a plurality of information, FIG. 36 shows a method of editing the message. Since the mobile terminal shown in FIG. 36 has spatial constraints of a display unit compared to the aforementioned mobile terminal such as a smartphone, it may be more required to perform message editing.

As shown in FIG. 36 (*a*), the mobile terminal can output a message 3621 received from a transmission device in a message interface 3610. For example, the received message 3621 corresponds to a message including a plurality of information. In this instance, since a size of the display unit of the mobile terminal is small, if a length of the received message 3621 exceeds a length of the display unit, the message can be output by an operation of scrolling of a user.

In addition, the mobile terminal can sense a first input signal 3631 input on the received message 3621. The first input signal 3631 can include a touch input, a gesture input and the like input on a region corresponding to a partial information of the received message 3621.

As shown in FIG. 36 (*b*), the mobile terminal can display a web page 3640 corresponding to a web link included in the received message 3621. In relation to this, the mobile terminal can display the web page 3640 by executing a web page interface by multitasking in the middle of executing the message interface 3610.

In addition, the mobile terminal can sense a second input signal 3632 input on the web page 3640. The second input signal 3632 corresponds to an input signal for capturing or storing an image included in the web page 3640. For example, as shown in FIG. 36 (*b*), the second input signal 3632 can include an input on a touch screen such as a touch input and a gesture input. Further, for example, the second input signal 3632 can include an input on a soft key or a hardware key mounted on the mobile terminal.

The mobile terminal can capture or store the image included in the web page 3640. Further, as shown in FIG. 36 (*c*), the mobile terminal terminates the web page interface, returns to the message interface 3610 and can output the captured or stored image 3622 instead of the message 3621.

As mentioned earlier in the embodiment of FIG. 28, if time information is included in a received message or time information configured by a transmission device is received, the mobile terminal can output the captured or stored image 3622 and the time information at the same time.

FIG. 37 shows a method of outputting a web page associated with a message received by a mobile terminal. As shown in FIG. 37 (*a*), the mobile terminal can output a message 3720 received from a transmission device in a message interface 3710. For example, the received message 3720 corresponds to a message including a web link. In addition, the mobile terminal can sense a first input signal 3731 input on the received message 3720. The first input signal 3731 can include a touch input, a gesture input and the like input on a region corresponding to the web link included in the received message 3720 or a region adjacent to the web link.

As shown in FIG. 37 (b), the mobile terminal can display a web page corresponding to the web link included in the received message 3720. In relation to this, the mobile terminal can display a web page by executing a web page interface by multitasking in the middle of executing the message interface 3710.

Meanwhile, a first web page 3741 displayed in an embodiment of FIG. 37 (b) corresponds a part of area of the web page corresponding to the web link included in the received message 3720. This is because, since a space of the display unit of the mobile terminal is not sufficient enough, it is difficult to display great amount of information at a time. Hence, the mobile terminal can display a ratio of the currently displayed first web page 3741 to the whole of a web page to be displayed at the bottom of the display unit via an indicator. For example, as shown in FIG. 37 (b), the indicator can indicate that the first web page 3741 corresponds to a first page among the whole of the web page.

In addition, the mobile terminal can sense a second input signal 3732 input on the first web page 3741. The second input signal 3732 corresponds to a flicking touch input or a drag touch input moving in left direction. As shown in FIG. 37 (c), the mobile terminal can display a second web page 3742. Further, the mobile terminal can display an indicator indicating that the second web page 3742 corresponds to a second page among the whole of the web page.

Also, the mobile terminal can sense a third input 3733 input on the second web page 3742. The third input signal 3733 corresponds to a flicking touch input or a drag touch input moving in left direction. As shown in FIG. 37 (d), the mobile terminal can display a third web page 3743. Further, the mobile terminal can display an indicator indicating that the third web page 3743 corresponds to a third page among the whole of the web page.

Advantageous effects of a mobile terminal according to an embodiment of the present invention and a method of controlling therefor are explained in the following. According to at least one or more embodiments of the present invention, among a plurality of messages included in a message history, a mobile terminal deletes a message stored or checked by a user from the message history to make a user more efficiently use a message interface.

According to at least one or more embodiments of the present invention, for a long message among a plurality of messages included in a message history, a mobile terminal edits the long message to be short to make a user more efficiently use a message interface. According to at least one or more embodiments of the present invention, if a plurality of information are included in a received message, a plurality of the information are edited to output information preferred by a user only. By doing so, a problem of inconvenience of checking the message again can be prevented.

According to at least one or more embodiments of the present invention, if such time information as a validity period, a meeting schedule or the like is included in a received message, a mobile terminal can display not only the received message but also the time information to make a user easily recognize the time information.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art.

The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
a display;
a wireless communication processor configured to transceive a message with an external device; and
a controller configured to:
display a message interface including a plurality of messages transceived with the external device on the display, and
in response to a message change condition indicating a change in a respective message among the plurality of messages transceived with the external device, update and display without user interaction the message interface to indicate the change to the respective message,
wherein the controller is further configured to:
in response to the respective message including an image and the message change condition corresponding to the image being stored, stop displaying the image in the message interface,
in response to the respective message including the image and the message change condition corresponding to not being stored within a predetermined time after receiving the respective message, stop displaying the image in the message interface, and
in response to the respective message including contact information and the message change condition corresponding to the contact information being stored, stop displaying the contact information in the message interface.

2. The mobile terminal of claim 1, wherein the controller is further configured to stop displaying the respective message in the message interface in response to the message change condition.

3. The mobile terminal of claim 2, wherein the message change condition corresponds to a predetermined time elapsing after the respective message is received.

4. The mobile terminal of claim 3, wherein the controller is further configured to display an uncheck indicator indicating content included in the respective message was not checked within the predetermined time.

5. The mobile terminal of claim 2, wherein the message change condition corresponds to content included in the first message being shared.

6. The mobile terminal of claim 5, wherein the sharing of the content includes at least one of storing the content, checking the content and transmitting the content to a different device.

7. The mobile terminal of claim 2, wherein the message change condition corresponds to content contained in the first message being executed.

8. The mobile terminal of claim 7, wherein the content contained in the respective message comprises at least one of an image content, a video content, a contact content, an audio content, a web link content and a map content.

9. The mobile terminal of claim 1, wherein the controller is further configured to:
display contents of the respective message on the display in response to a first input signal input on the respective message, and
display a part of the contents of the respective message in the message interface without displaying the other parts of the contents of the respective message in response to a second input signal selecting the part of the contents.

10. The mobile terminal of claim 9, wherein the controller is further configured to stop displaying the other parts of the contents of the respective message in response to the second input signal input on the contents displayed on the display.

11. The mobile terminal of claim 10, wherein the controller is further configured to display an edit indicator on the display indicating that the respective message has been edited.

12. The mobile terminal of claim 1, wherein the controller is further configured to display a first time indicator on the display indicating first time information indicating a time included in the respective message in response to the message change condition.

13. The mobile terminal of claim 12, wherein the controller is further configured to display an additional message on the display in response to the time included in the respective message expiring.

14. The mobile terminal of claim 1, wherein:
in response to the respective message including a recording and the message change condition corresponding to the recording being played, the controller is further configured to stop displaying the message including the recording in the message interface, and
in response to the respective message including the recording with a portion of the recording including a secret message, and the message change condition corresponding to the recording being played with the secret message, the controller is further configured to display the message including the recording without a portion corresponding to the secret message in the message interface.

15. The mobile terminal of claim 1, wherein in response to the respective message including a weblink and the message change condition corresponding to the weblink being selected, the controller is further configured to stop displaying the message including the weblink in the message interface.

16. The mobile terminal of claim 1, wherein in response to the respective message including map information identifying a location and the message change condition corresponding to following messages transceived with the external device indicating arrival location information indicating the mobile terminal has arrived at the location identified in the map information, the controller is further configured to stop displaying the message including the map information in the message interface.

17. A method of controlling a mobile terminal, the method comprising:
transceiving, via a wireless communication processor, a plurality of messages with an external device;
displaying, via a display, a message interface including the plurality of messages transceived with the external device on the display; and
in response to a message change condition indicating a change in a respective message among the plurality of messages transceived with the external device, updating and displaying without user interaction, via a controller, the message interface to indicate the change to the respective message,
wherein the displaying further comprises:
in response to the respective message including an image and the message change condition corresponding to the image being stored, stopping displaying the image in the message interface;
in response to the respective message including the image and the message change condition corresponding to not being stored within a predetermined time after receiving the respective message, stopping displaying the image in the message interface; and
in response to the respective message including contact information and the message change condition corresponding to the contact information being stored, stop displaying the contact information in the message interface.

18. The method of claim 17, further comprising:
stop displaying the respective message in the message interface in response to the message change condition.

19. The method of claim 18, wherein the message change condition corresponds to a predetermined time elapsing after the respective message is received or content included in the first message being shared.

* * * * *